United States Patent
Liu et al.

(10) Patent No.: US 11,422,864 B2
(45) Date of Patent: Aug. 23, 2022

(54) ADVANCED RESOURCE LINK BINDING MANAGEMENT

(71) Applicant: CONVIDA WIRELESS, LLC, Wilmington, DE (US)

(72) Inventors: Lu Liu, Conshohocken, PA (US); Chonggang Wang, Princeton, NJ (US); Quang Ly, North Wales, PA (US); Xu Li, Plainsboro, NJ (US); Zhuo Chen, Claymont, DE (US); Michael F. Starsinic, Newtown, PA (US)

(73) Assignee: Convida Wireless, LLC, Wilmington, DE (US)

(*) Notice: Subject to any disclaimer, the term of this patent is extended or adjusted under 35 U.S.C. 154(b) by 0 days.

(21) Appl. No.: 17/276,943

(22) PCT Filed: Sep. 10, 2019

(86) PCT No.: PCT/US2019/050360
§ 371 (c)(1),
(2) Date: Mar. 17, 2021

(87) PCT Pub. No.: WO2020/068412
PCT Pub. Date: Apr. 2, 2020

(65) Prior Publication Data
US 2022/0050726 A1  Feb. 17, 2022

Related U.S. Application Data

(60) Provisional application No. 62/738,294, filed on Sep. 28, 2018.

(51) Int. Cl.
G06F 9/50 (2006.01)
H04L 67/14 (2022.01)

(52) U.S. Cl.
CPC ............ *G06F 9/5061* (2013.01); *H04L 67/14* (2013.01)

(58) Field of Classification Search
CPC .............................. G06F 9/5061; H04L 67/14
See application file for complete search history.

(56) References Cited

U.S. PATENT DOCUMENTS

| | | |
|---|---|---|
| 2008/0310349 A1 | 12/2008 | Ulupinar et al. |
| 2010/0011145 A1 | 1/2010 | Carver et al. |
| 2014/0036675 A1 | 2/2014 | Wang et al. |
| 2014/0359131 A1 | 12/2014 | Seed et al. |
| 2016/0099953 A1* | 4/2016 | Hebert ............... H04L 63/1433 726/23 |
| 2020/0177681 A1* | 6/2020 | Wang ................... H04L 47/801 |

FOREIGN PATENT DOCUMENTS

| | | |
|---|---|---|
| EP | 3355535 A1 | 8/2018 |
| WO | 2010/006132 A2 | 1/2010 |

* cited by examiner

*Primary Examiner* — Kristie D Shingles
(74) *Attorney, Agent, or Firm* — BakerHostetler

(57) ABSTRACT

A link binding chain is disclosed that enables multiple hops of link bindings to be cascaded to form a chain of link bindings. The binding chain can be leveraged when a one-hop link binding is infeasible or fails to be established. Dynamic binding method switching is disclosed for updating the binding method after a link binding has been established such that the link binding may be selected for a more proper or efficient link binding method to adapt to the changing environment. Methods for broker assisted link binding are disclosed to facilitate link binding functionalities between a source resource and a destination resource that are connected through a binding broker.

20 Claims, 28 Drawing Sheets

ADVANCED RESOURCE LINK BINDING MANAGEMENT

CROSS-REFERENCE TO RELATED APPLICATIONS

This application is the National Stage of International Patent Application No. PCT/US2019/050360, filed Sep. 10, 2019, which claims the benefit of U.S. Provisional Application No. 62/738,294, filed Sep. 28, 2018, the disclosure of which is incorporated herein by reference in its entirety.

BACKGROUND

A link binding between a source resource and a destination resource may be described and recorded as a binding entry. A binding table located at a SRH or a DRH may maintain one or more of the binding entries. Each binding entry may define a binding relationship between a source resource and a destination resource and may comprise one or more binding attributes. Binding attributes may specify binding the method and conditions for state synchronization, including Minimum and Maximum Period, Change Step, Greater or Less Than, and Notification Band (see Z. Shelby, M. Koster, C. Groves, J. Zhu, and B. Silverajan, "Dynamic Resource Linking for Constrained RESTful Environments," IETF CoRE Working Group I-D, Submitted on Jul. 3, 2018).

The following three binding methods have been proposed to synchronize the content of a source resource to a destination resource. It is understood that the terms "binding method" and "binding mode" may be used interchangeably herein.

Polling: In this method, a DRH sends periodic requests to a SRH to copy the content of a source resource to a destination resource. The binding entry for this method may be stored on the DRH. The DRH may ensure that the polling frequency does not exceed the limits defined by the Minimum Period and the Maximum Period attributes of the binding entry. The copying process may filter out content from the requests using value-based conditions (e.g., based on one of more of the Change Step, Less Than, and/or Greater Than attributes).

Observe: In this method, a DRH creates an observation/subscription relationship between the DRH and the source resource hosted on a SRH. For each notification that will be triggered according to one or more value-based conditions (e.g., based on the Change Step, Less Than, and/or Greater Than attributes), the content from the source resource may be copied to the destination resource. The binding entry for this method may be stored on the DRH.

Push: In this method, a SRH sends requests to the destination resource when the binding condition attributes are satisfied for the source resource. The request may contain a copy of the content of the source resource. The binding entry for this method may be stored on the SRH.

SUMMARY

A link binding chain is disclosed where multiple hops of link bindings may be cascaded to form a chain of bindings. The link binding chain can be leveraged when a one-hop link binding is infeasible or fails to be established. Methods for extending a link binding into a binding chain (including cascading and inserting new hops) and methods for compressing a binding chain to reduce the number of hops (which may enable the dynamic adjustment of a link binding chain length together with a chain extension) are also disclosed.

Dynamic binding method switching is disclosed for updating the link binding method after a link binding has been established such that the link binding may be selected for a more proper or efficient method to adapt to the changing environment. Interactions between the source resource and the destination resource to facilitate the switching are described, including procedures for switching from a "Polling/Observe" method to a "Push" method and for switching from a "Push" method to a "Polling/Observe" method.

Methods for broker assisted link binding are disclosed to facilitate link binding functionalities between a source resource and a destination resource that are connected through a binding broker. These methods are particularly useful for the link binding creation and operation procedures, which are largely impacted by the introduction of the binding broker. Methods for link binding update, suspension, restoration and cancellation are also disclosed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
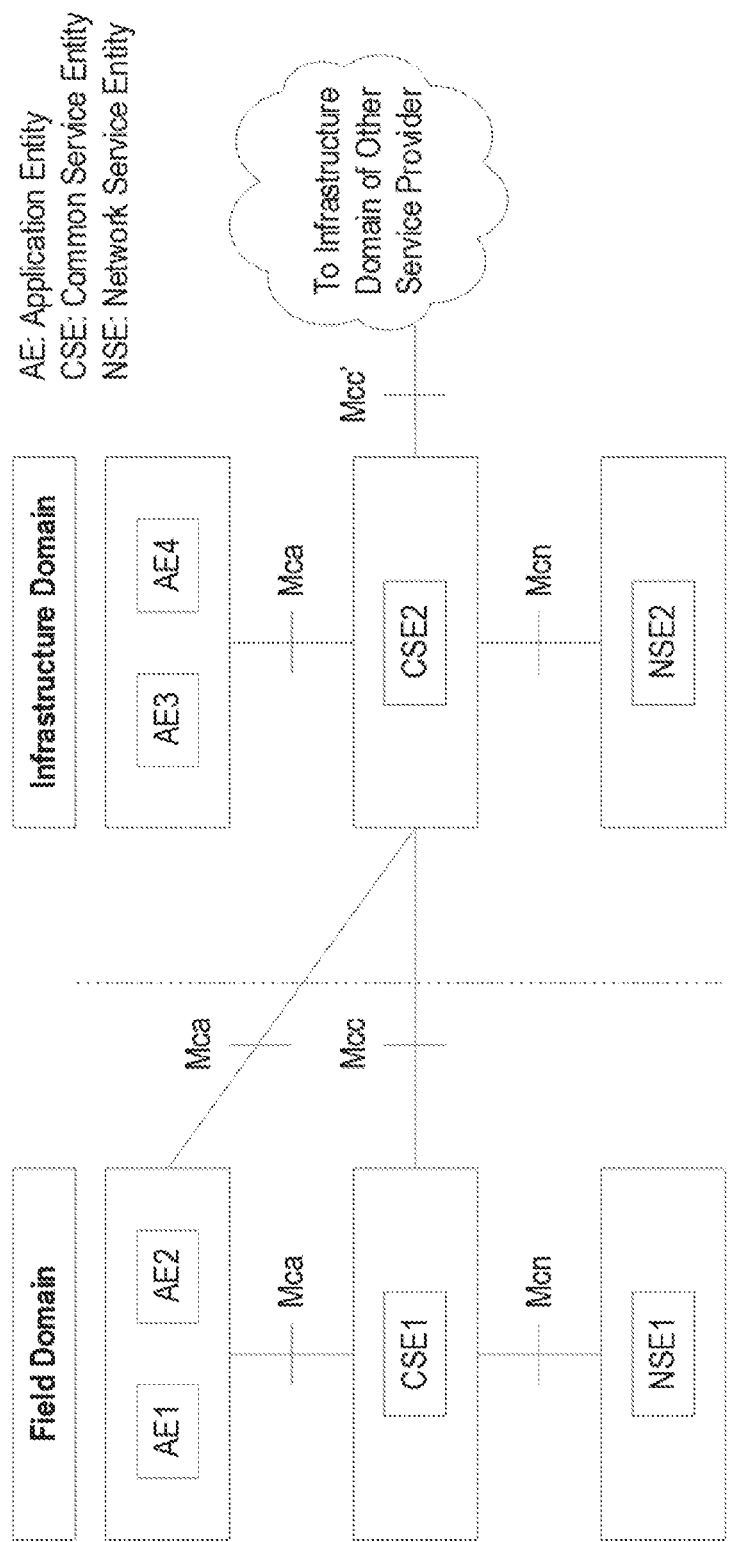
FIG. 1 shows a block diagram of an example oneM2M architecture.

The oneM2M standard defines a Service Layer called a "Common Service Entity (CSE)" (see oneM2M Technical Specification, oneM2M-TS-0001-V3.11.0). The purpose of the Service Layer is to provide "horizontal" services that can be utilized by different "vertical" M2M systems and applications. The CSE supports four reference points, as shown in FIG. 1. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)" such as "Discovery" and "Data Management & Repository." As shown in FIG. 1, the oneM2M architecture enables the following types of nodes:

Application Service Node (ASN): A node that contains one CSE and contains at least one Application Entity (AE). Example of physical mapping: an ASN could reside in an M2M Device.

Application Dedicated Node (ADN): A node that contains at least one AE and does not contain a CSE. There may be zero or more ADNs in the Field Domain of the oneM2M System. Example of physical mapping: an ADN could reside in a constrained M2M device.

Middle Node (MN): A node that contains one CSE and contains zero or more AEs. There may be zero or more MNs in the Field Domain of the oneM2M System. Example of physical mapping: a MN could reside in an M2M Gateway.

Infrastructure Node (IN): A node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN): A node that does not contain oneM2M Entities (neither AEs nor CSEs). Such nodes represent devices attached to the oneM2M system for interworking purposes, including management.

Link binding management has been proposed to efficiently establish and manage link bindings among different resources. Two example link binding management architectures are disclosed herein. In a first example architecture, a RC, a SRH, a DRH, and a LBC work together to manage link bindings. In a second example architecture, a RR may be included instead of the RC. Interactions among these entities have been developed for both architectures, which may include one or more of the following procedures:

Resource creation/registration with binding support: the RC may create source and/or destination resources at the SRH/DRH, providing binding support by indicating binding hints for the resource or directly creating the link binding. Additionally or alternatively, the resource host (either the SRH or DRH) may register resources to the RR. The RR may make binding recommendations based on the registered resources;

Resource discovery for link binding: the LBC may discover resource(s) from one or more of the DRH, the SRH, or the RR by applying filters such as binding role and binding attributes, depending on which resources for link binding are identified;

Link binding creation: the LBC triggers to create a link binding at the DRH for Polling/Observe mode or at the SRH for Push mode. The LBC instructs both the DRH and the SRH to be aware of each other's context information and binding attributes of the created link binding. Alternatively, the SRH (or the DRH) can initiate the creation by sending a request to the DRH (or the SRH) for Polling/Observe (Push) mode. The created link binding may be registered to the RR. While the binding entry is maintained at one endpoint, the binding information (e.g., binding URI, resource URIs, and binding attributes) can be stored at the other endpoint in a form other than a binding entry;

Binding-aware content synchronization: binding-aware content synchronization may be repeatedly conducted from the SRH to the DRH according to the configured binding mode. A link binding indicator such as binding attributes may be contained in the exchanged messages so that the SRH or DRH is aware that the corresponding context exchange is repeatable content synchronization due to a link binding;

Link binding update: an established link binding can be updated by one or more of the LBC, DRH or SRH. The values of the binding attributes other than the binding method can be updated during this procedure. The source or destination resource can also be changed to a new resource;

Link binding suspension and restoration: an established link binding can be suspended by one or more of the LBC, DRH or SRH. Similarly, a halted link binding can be restored or resumed. The suspension or restoration may be triggered by the DRH under Push mode or by the SRH under Polling/Observe mode; and Link binding cancellation: an existing link binding may be removed or canceled by one or more of the LBC, DRH or SRH.

Figure 2:
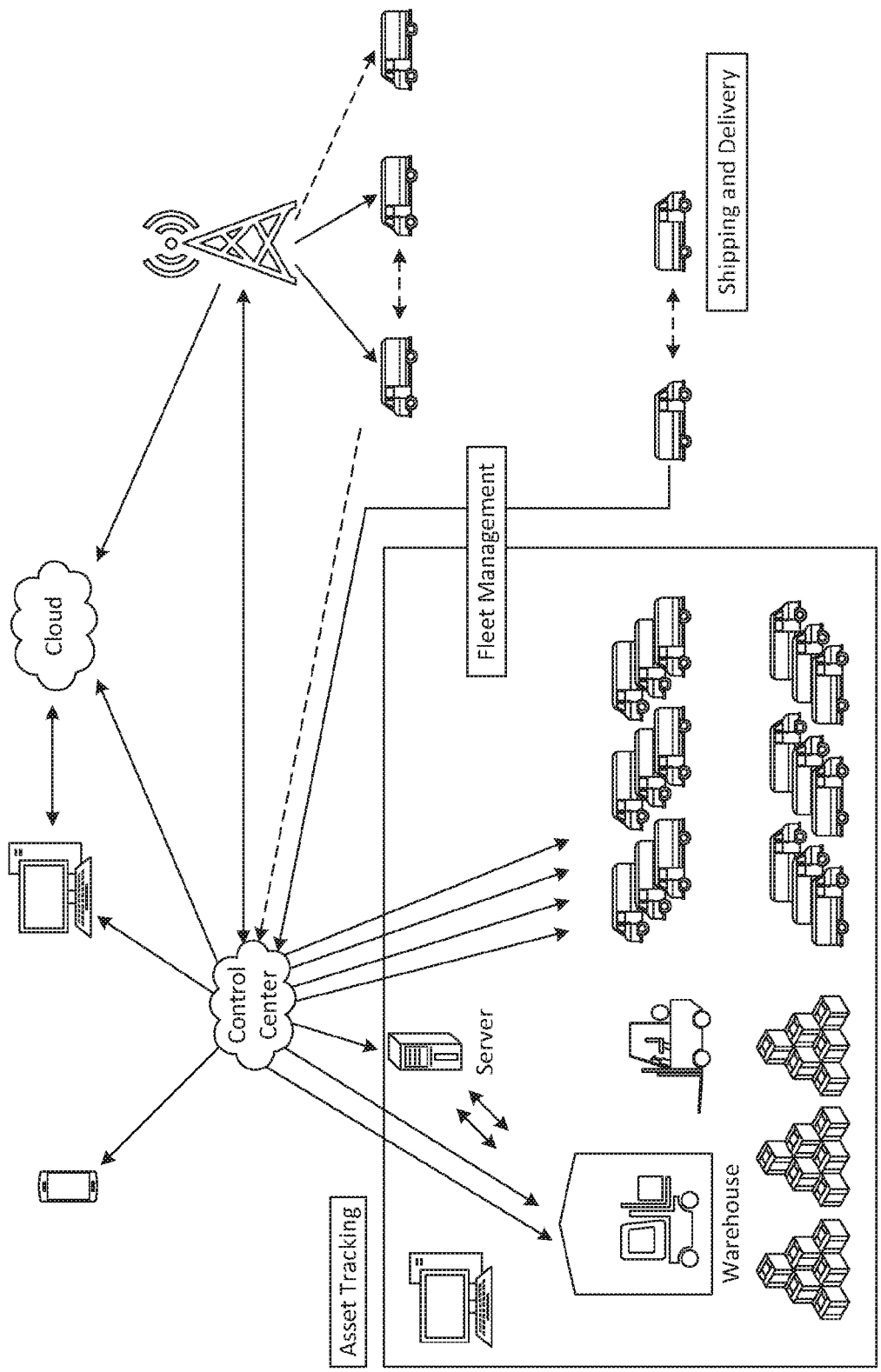
FIG. 2 shows a flow chart of example interactions between IoT devices.

FIG. 2 illustrates an example smart industrial IoT scenario which involves asset tracking, fleet management and transportation. Link binding may be utilized in different aspects such as monitoring the inventory levels and warehouse environment, tracking fleet vehicles and shipment, sharing traffic information and optimizing package delivery. Among these scenarios, some may be associated with particular requirements that may bring issues to the efficiency or even feasibility of the existing binding scheme.

Scenario 1: The warehouse is managed by a central entity (e.g., a private cloud) which is tracking the inventory levels in different aisles, racks and even loading/unloading units (e.g., trucks). Link bindings may be set up between the central entity and the monitoring units in each local area to synchronize the inventory information, with the local units hosting the source resources and the central entity hosting the destination resources. A user that is interested in a particular type of goods may also want to establish a binding with the source resource which contains the inventory information of the target goods. For example, a popular product may attract the interests from the manufacturer, multiple sellers and/or customers. In this case, there could be a large number of binding requests, which may exceed the limit of the source resource and a request of binding creation may be rejected. Failure of the binding creation may also occur when the source and destination hosts cannot agree on the binding method. For example, a binding is to be established between the source resource of temperature sensor readings and the destination resource of AC controller. Since both endpoints are located in constrained devices, neither of them wants to maintain the binding entry, thus they cannot agree on either Polling or Push binding method. Moreover, a binding may fail to be established or maintained due to the disconnection or poor communication quality between the source and destination, such as when the delivery truck is in an area with low signal coverage or has to compete for bandwidth with many other vehicles in a crowded area. Similarly, the efficiency of a direct binding between the cloud and the edge of the network may be affected by the congestion conditions at the edge or the bandwidth to the cloud. Therefore, there could be many factors that may lead to inefficient bindings or even failure of establishing or maintaining a link binding.

Scenario 2: In order to determine the proper binding method between the central controller and the monitoring units, several aspects should be taken into consideration. A "Polling" binding may not be preferred at the first site since it may lead to large communication overhead due to periodic polling messages and may consume considerable amount of storage resource in storing a large number of binding entries. However, if "Push" method is used, then during the busy periods such as loading and unloading, a burst of push messages will be sent to the central unit, in which case "Polling" would be better since the central unit can leverage multi-cast for sending out polling messages or stagger communications. In another case, a "Polling" binding may be set up between the central unit and a truck in the fleet, where the status of the truck or the goods in the truck is the source resource to be tracked by the destination resource in the central unit. When the truck is parking in the warehouse, a "Polling" method is preferred such that the truck does not have to maintain the binding entry. As the truck leaves the warehouse for shipping or delivery, it may become difficult or impossible for the polling message to reach the truck, thus a "Push" method is preferred. Moreover, the nodes at or near the edge of the network may be highly dynamic in terms of storage or power level. Thus, the link bindings associated with the resources on such nodes may have changing preferences on binding methods. From these use cases, it can be seen that a suitable binding method at one time instance may become unsuitable due to changing circumstances such as environment or mobility.

Scenario 3: A broker based publish-subscribe communication scheme may be used to facilitate the communication with limited reachability nodes, such as constrained devices that are applying sleep schedule or devices behind a middle-box (e.g., firewall, network address translator) (see M. Koster, A. Keranen, and J. Jimenez, "Publish-Subscribe Broker for the Constrained Application protocol (CoAP)," IETF CoRE Working Group I-D, Submitted on Jul. 2, 2018). With this scheme, the source resource may be published to the Broker, which can be retrieved by the destination resource. Since the source node may not be reachable all the time and the source resource is hosted at the broker, a binding could be established between the broker and the destination. However, the broker may not have the up-to-date content of the source. For example, the source may publish the sensor reading to the broker as the source resource whenever the value is beyond a threshold, while the destination resource wants to get the real-time value of sensor reading. If the binding is set up between the broker and the destination, then it may be possible that the destination may never get any update. When a broker sits between the source node and destination node, the preferences of the source may not be considered when the link is established between the destination and broker. Similarly, the preferences of the destination may not be considered when the link is established between the source and broker.

As discussed further herein, a number of problems exist with respect to the current link binding schemes which require further improvement.

Problem 1: Lack of remedies when Link Binding Creation Request is declined. The creation of a link binding may not be successful. In some cases, a new request can be generated to adjust the parameters indicated in the rejection reason, but in other cases, there is no such remedy. For example, if the number of bindings associated with a source resource becomes too large for a constrained device, any further binding request will be rejected, regardless of the settings of attributes. Moreover, if two endpoints of resources cannot agree on one binding method, or the physical communication condition is very poor, the binding cannot be created or maintained properly. These situations may also happen in a dynamic environment, calling for remedies that can adapt to changing context.

Problem 2: Binding method cannot be changed once the link binding is created. The existing link binding update procedures are able to update most of the binding attributes (such as the minimum and maximum synchronization period) after a binding has been created. However, the binding method may not be able to be changed. In other words, the binding method will be fixed after a link binding is established. Under a dynamic environment, the configured binding method may become inefficient and it may be desirable to change the configured method. For example, a source resource is bound with a destination resource using "Polling" method. As the number of destination resources bound to this source resource increases, the source resource may prefer a "Push" method to leverage multi-cast to reduce the communication overhead. In another example, a source resource hosted on a stable node may prefer "Polling" method, but as the node becomes mobile, a "Push" method may be preferred. The number of bindings, mobility of resource hosts, or the status of resources and the hosts may all affect the efficiency of the binding method, and the dynamics of these factors require the binding method to be adjustable as well.

Problem 3: Creating a binding when the source and destination resources are connected through a binding broker. The binding broker based scheme enables communications with limited reachability nodes, but causes an issue for link bindings since the source endpoint and the host of source resource are separated to different physical nodes. Extending the binding broker based relationships to facilitate link binding functionalities becomes a new problem, which requires modifications of the procedures in existing link binding solutions.

Advanced link binding solutions to counter the issues that may arise in existing link binding schemes are disclosed herein. Specifically, the following example ideas are proposed:

A link binding chain is disclosed where multiple hops of link bindings may be cascaded to form a chain of bindings. The link binding chain can be leveraged when a one-hop link binding is infeasible or fails to be established. Methods for extending a link binding into a binding chain (including cascading and inserting new hops) and methods for compressing a binding chain to reduce the number of hops (which may enable the dynamic adjustment of a link binding chain length together with a chain extension) are also disclosed.

Dynamic binding method switching is disclosed for updating the link binding method after a link binding has been established such that the link binding may be selected for a more proper or efficient method to adapt to the changing environment. Interactions between the source resource and the destination resource to facilitate the switching are described, including procedures for switching from a "Polling/Observe" method to a "Push" method and for switching from a "Push" method to a "Polling/Observe" method.

Methods for broker assisted link binding are disclosed to facilitate link binding functionalities between a source resource and a destination resource that are connected through a binding broker. These methods are particularly useful for the link binding creation and operation procedures, which are largely impacted by the introduction of the binding broker. Methods for link binding update, suspension, restoration and cancellation are also disclosed.

Several terms that may be used herein are described below to facilitate the improved link binding solutions:

Source Resource Host (SRH): a logical entity which hosts source resources. As an example, a oneM2M CSE, a WoT Servient, a 3GPP Network Function, or an OIC Server can be a SRH. Note that for consistency, the term SRH is continued to be used to stand for the source endpoint in binding broker assisted binding, although the source resource may be hosted in the broker.

Destination Resource Host (DRH): a logical entity which hosts destination resources. As an example, a oneM2M CSE, a WoT Servient, a 3GPP Network Function, or an OIC Server can be a DRH.

Link Binding Coordinator (LBC): a logical entity or a management application which manages link bindings between source resources and destination resources (e.g., to discover source resources and destination resources, to formulate appropriate link bindings, to create a link binding, to update a link binding, to suspend a link binding, to resume a link binding, and to cancel a link binding). As an example, a oneM2M AE/CSE, a WoT Client, a 3GPP Network Function, or an OIC Client can be a LBC.

Binding Chain: a sequence of link bindings connected in a chain comprising multiple hops, where each hop stands for a link binding with the source resource in a hop being the destination resource of the previous hop, and the destination resource in a hop being the source resource of the next hop. The binding chain could be formed by cascading or inserting a new hop into a binding, and could be compressed by removing one hop from the chain.

Binding Broker: a logical entity that enables indirect communications between the source and destination resources by exposing corresponding API for SRH and DRH to initiate interactions such as publish and subscribe. Specifically, the binding broker stores the content of a source resource, which can be accessed by a destination resource. The binding broker acts as a relay or a proxy between the source resource and destination resource, which is useful especially when there is limited direct reachability between the source resource and the destination resource. The broker may need to be reachable for the resource hosts and have sufficient resources for hosting the resources and communicating with the other hosts.

In a first aspect, methods and systems associated with a binding chain are disclosed. For example, methods for extending a binding to a chain through cascading or insertion and compressing a binding chain by removing an intermediate hop from the chain are disclosed. A binding chain can be utilized, for example, when a one-hop link binding is infeasible or fails to be established (e.g., to solve Problem 1 discussed above). The length of the formed binding chain can be adjusted dynamically to adapt to different scenarios.

In a second aspect, methods and systems for dynamic binding method switching are disclosed. Procedures associated with dynamic binding method switching are also disclosed, with which the binding method can be updated after the link binding is established (e.g., to solve Problem 2 discussed above). With dynamic binding method switching, a link binding may be able to adapt to the dynamics of an environment by choosing a more proper or efficient method.

In a third aspect, methods and systems for assisted link binding are disclosed. The procedures for broker assisted link binding (e.g., to solve Problem 3 discussed above), especially for binding creation and operations, are designed to extend the binding broker based relationships between source and destinations such that link binding functionalities can be enabled.

In accordance with the first aspect of the disclosure, multiple link bindings can be connected in a series to form a binding chain. A link binding (one hop) can be extended to two hops, and further into multiple hops, to form a binding chain. On the opposite, a two-hop binding can be converted into one-hop, thus compressing the binding chain and reducing the number of hops. Table 1 shows eight different varieties for extension or compression depending on the binding method(s) used before and after the conversion.

TABLE 1

Binding Chain Extension and Compression

| 1-Hop Binding Method | | 2-Hop Binding | |
| --- | --- | --- | --- |
| | | First Hop Binding Method | Second Hop Binding Method |
| Push | →→ Binding Chain Extension (from 1-hop to 2-hop) | Push | Push |
| Polling/Observe | | Push | Push |
| Push | | Push | Polling/Observe |
| Polling/Observe | | Push | Polling/Observe |
| Push | ←← Binding Chain Compression (from 2-hop to 1-hop) | Polling/Observe | Push |
| Polling/Observe | | Polling/Observe | Push |
| Push | | Polling/Observe | Polling/Observe |
| Polling/Observe | | Polling/Observe | Polling/Observe |

A binding chain and the corresponding conversions may be used to resolve the problem when a one-hop binding fails to be established and to adapt to dynamic environments through extending or compressing the chain.

Figure 3:
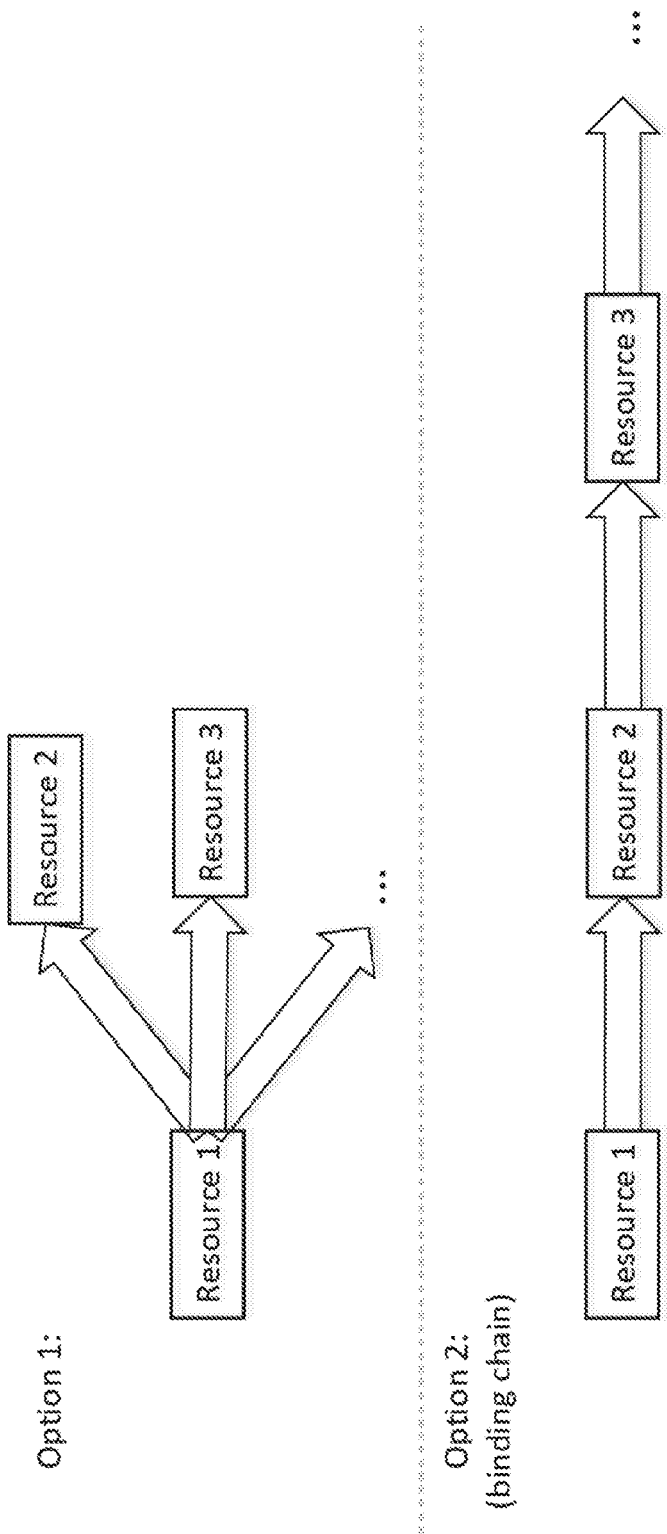
FIG. 3 shows a flow chart of an example binding chain.

A source resource may need to be bound with multiple destination resources. One way to achieve this is to create bindings between each pair of source and destination resources, which may create large overhead for the source resource as the number of destinations increases. Another option is through a binding chain that cascades several bindings in a sequence. For example, in FIG. 3, a binding has been created between the source resource (Resource 1) and a destination resource (Resource 2). In this example, another destination resource (Resource 3) also wants to bind with Resource 1. Resource 3 can create a binding either with Resource 1 (Option 1) or with Resource 2 (Option 2) since the content of Resource 1 and 2 can be viewed as equivalent after the binding. If Resource 3 chooses to bind with Resource 2, then Resource 2 can be viewed as the source resource of Resource 3, and the three resources form a binding chain with two hops. Resource 2 can be viewed as an intermediate resource, which acts as both destination resource (binding with Resource 1) and source resource (binding with Resource 3) at the same time. Similarly, if more destinations want to bind with the source resource, then the binding can be created with any of the resources in the binding chain.

Figure 4:
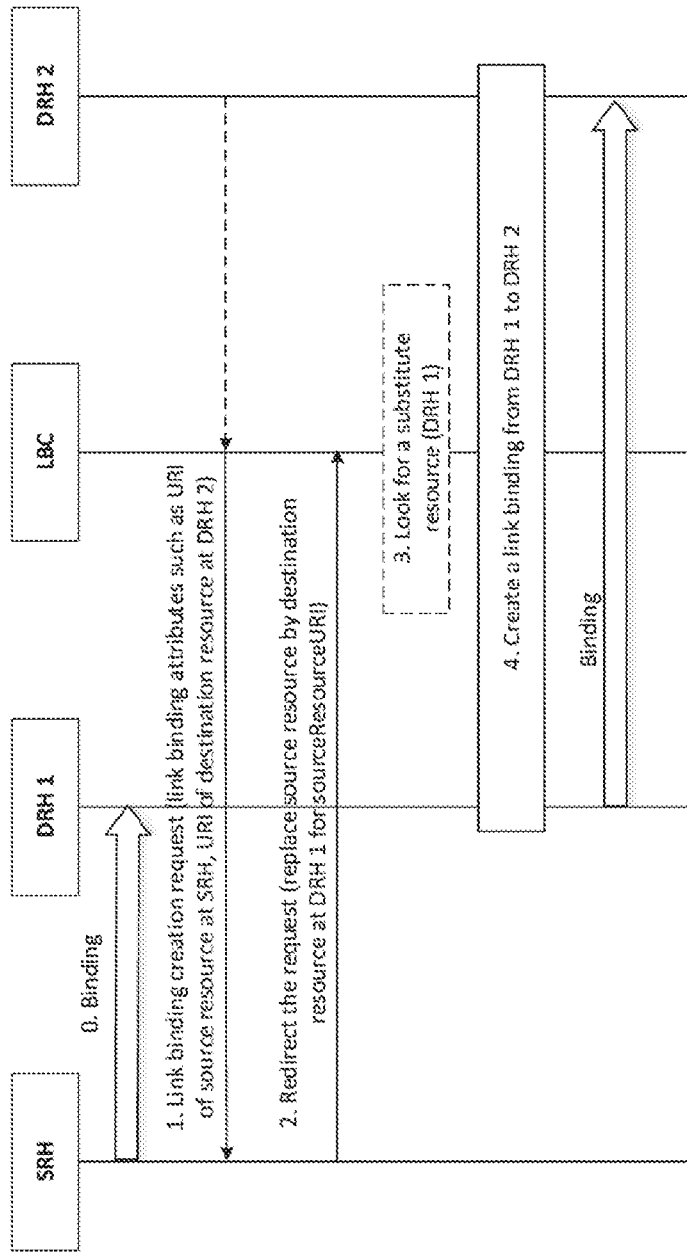
FIG. 4 shows a flow chart of an example method for binding chain extension using cascading.

By enabling a binding chain, the link bindings at the source resource can be offloaded to the destination resources that are already bound to this source resource, thus resolving the problem when the number of bindings to a source resource exceeds the limit. The procedures of cascading a new hop of binding to an existing binding or binding chain may be the same as creating a new binding by simply treating the to-attach resource as the source resource. An example scenario of a binding chain extension with cascading is shown in FIG. 4.

At step 0, a link binding has been established from the SRH to DRH 1.

At step 1, a link binding creation request to bind SRH with DRH 2 is sent to the SRH. The request may contain the URI of SRH as the source resource, and the URI of DRH 2 as the destination resource. The request may be initiated by the LBC, or initiated by DRH 2 and forwarded by the LBC. Note that the LBC and DRH 2 may be located on the same node.

At step 2, the SRH is unable to create more link bindings, thus redirecting the binding request to the LBC. Different from rejecting the request, the redirection indicates the binding can still be established, but with another resource that has already been bound with the source resource. Optionally, if the SRH has stored the information of existing link bindings (such as the binding with DRH 1), the SRH may suggest the LBC to consider binding with the destination resource at DRH 1 instead of the source resource by replacing the source resource URI in the original request. Additionally or alternatively, the SRH can redirect the request to DRH 1. If DRH 1 agrees to create the binding with DRH 2 instead of SRH, DRH 1 may inform the LBC of the change of source resource.

At step 3, if the LBC receives the redirected request from the SRH in Step 2, the LBC may look for a substitute resource that DRH 2 can bind with. The LBC can check the destination resources that have already been bound with the source resource.

At step 4, if an alternative resource is found (at DRH 1), then the LBC may create a new link binding creation request between DRH 1 and DRH 2 and send it to DRH 1, followed by the normal procedures of link binding creation. Additionally or alternatively, if in step 2 the original request is redirected from SRH to DRH 1, and DRH 1 agrees to bind with DRH 2, DRH 1 may send a notification to DRH 2. Notice that DRH 2 may reject the substitution since the indirect binding with the source resource may lead to extra delay in content synchronization.

Different from directly binding with SRH, the cascaded binding chain between DRH 2 and SRH is prone to the failure of DRH 1. In case DRH 1 fails, DRH 2 may either send a binding request to SRH (if DRH 2 is aware of SRH when creating link binding at the first attempt) or ask the LBC to create a new binding (if the binding between DRH 2 and DRH 1 was instructed by the LBC).

Figure 5:
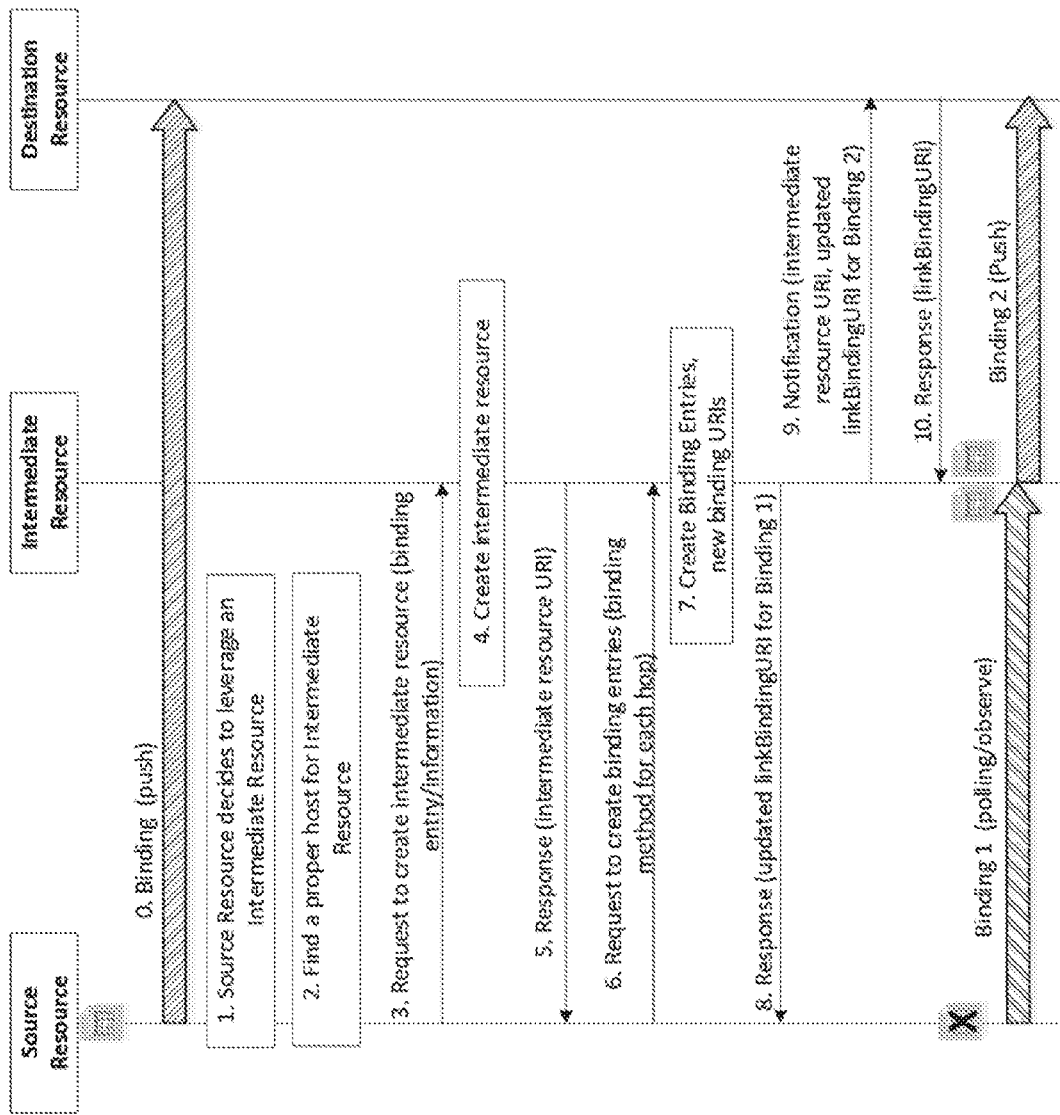
FIG. 5 shows a flow chart of an example method for binding chain extension using an intermediate resource.
Figure 6:
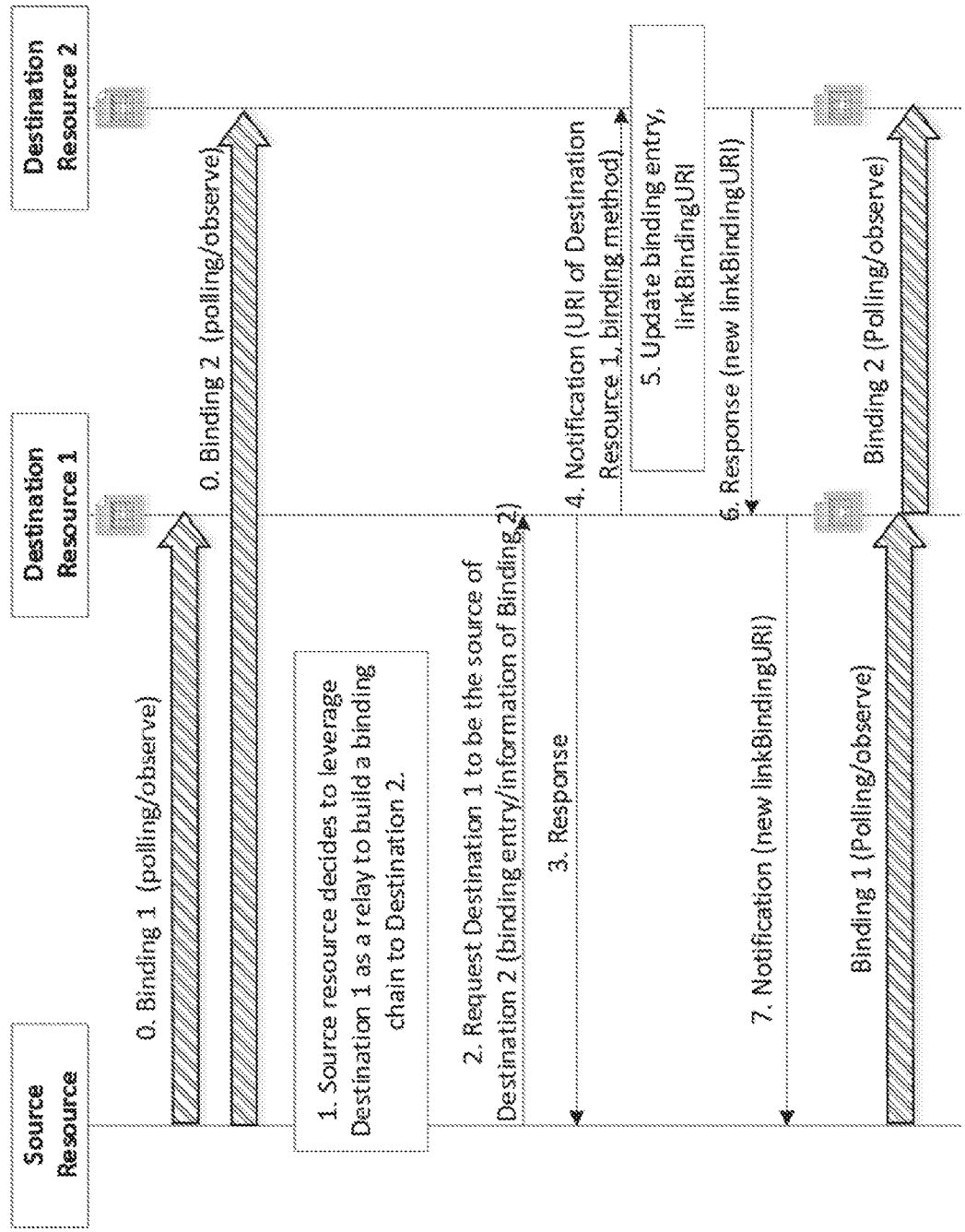
FIG. 6 shows a flow chart of an example method for binding chain extension using a relay.

In addition to cascading, binding chain can also be extended by inserting one hop between the source and destination resource. The extension can be initiated by any resource host in the binding chain or by the LBC. Two example scenarios are shown in FIGS. 5 and 6.

Inserting an intermediate resource can be used when one endpoint of the link binding moves behind an intermediate node (e.g., a gateway), or to resolve the disagreement of binding attributes between two endpoints, such as the binding method. Consider the scenario that one endpoint (either the SRH or the DRH) wants to change the current binding method while the other endpoint refuses to change. In this case, an intermediate resource can be introduced to extend the binding to two hops, resolving the disagreement of binding method. An example method for a binding chain extension using an intermediate resource is shown in FIG. 5.

At step 0, a "Push" link binding between the source and destination resources has been established, and a binding entry is maintained at the SRH.

At step 1, upon some trigger, the SRH decides to leverage an intermediate resource and extend the current one-hop binding to two-hop. For example, if the SRH wants to switch from "Push" to "Polling" while the DRH does not agree, then an intermediate host can be utilized.

At step 2, the SRH then looks for a proper host for the intermediate resource. A host that can reach both the SRH and the DRH and has enough storage and communication capability can be selected to host the intermediate resource. For example, a regional fog node can be chosen to host the intermediate resource between an edge node and the cloud, or between two edge nodes.

At step 3, the SRH sends a request to the found host to create an intermediate resource. The request may contain the information of the existing binding, such as the URI of the destination resource and binding method, which may help the intermediate resource in creating the binding with the destination resource (e.g., as shown in step 6 and step 9).

At step 4, the found host creates an intermediate resource according to the SRH's request.

At step 5, the host of the intermediate resource sends a response to the SRH if the request is accepted, along with the URI of the newly created intermediate resource.

At step 6, the SRH sends the request to create two link bindings to the intermediate host, indicating the binding methods for both bindings. In the example shown in the figure, since the SRH prefers "Polling" method and the DRH prefers "Push" method, two binding entries are required to be created at the intermediate host, with the first one polling from the source and the second one pushing to the destination.

At step 7, the intermediate host creates binding entries as required and generates URIs for the two new bindings.

At step 8, a response is sent back to the SRH indicating that the binding entries have been created and the "Polling" binding between the source and intermediate resource has been established. The response may also contain the URI of the new binding between the source and intermediate resources.

At step 9, a notification is sent to the DRH notifying the DRH that the binding with the source resource is replaced by the binding with the intermediate resource. In other words, the source resource of its "Push" binding has been changed to the intermediate resource. The notification also contains the URI of the new binding between the intermediate and destination resources.

At step 10, the DRH sends a response to the intermediate resource host, confirming that the new link binding between them has been established and indicating that the binding chain extension has been completed.

Additionally or alternatively, in step 2, the SRH may ask the LBC to look for the intermediate resource and extend the one-hop binding into a two-hop. In this case, after the intermediate host is found and the intermediate resource created, the LBC may send the information back to the SRH and the rest of the steps may follow.

FIG. 6 shows a scenario where the source resource is originally bound with two destination resources separately. For example, the source resource is hosted on a node on the edge of the network, Destination Resource 1 is hosted on a regional router and Destination Resource 2 is hosted on the cloud. The communication quality between the source and Destination 2 may become poor due to distance or coverage issues, or the bandwidth may be limited. In this case, Destination 2 may leverage Destination 1 as a relay and establish a binding chain to the source through Destination 1. By converting the two separate bindings into a binding chain, the problem of binding failure due to connectivity can be resolved without introducing additional overhead. FIG. 6 shows an example method of a binding chain extension using a relay.

At step 0, "Polling/Observe" link bindings between the source and destination resources have been established, respectively, and a binding entry is maintained at each DRH.

At step 1, upon some trigger, the SRH decides to leverage the host of Destination 1 as a relay to build a binding chain to Destination Resource 2.

At step 2, the SRH sends a request to the host of Destination Resource 1, asking the latter to act as the source resource and bind with Destination Resource 2 using "Polling" method since the existing binding between the source and Destination Resource 2 is "Polling." The request may contain the information of Binding 2, such as the URI of Destination Resource 2, which may help the host of Destination Resource 1 in creating the binding with Destination Resource 2 (e.g., as shown in step 4).

At step 3, the host of Destination Resource 1 sends a response to the source resource as an agreement. Since the new binding between Destination Resource 1 and 2 is "Polling," Destination Resource 1 does not need to create new binding entry.

At step 4, the host of Destination Resource 1 sends a notification to Destination Resource 2, notifying the latter that Destination Resource 1 will replace the source resource and bind with Destination Resource 2. The notification may contain the URI of Destination Resource 1 as the new source resource and/or the binding method of the new binding between Destination resource 1 and 2.

At step 5, after receiving the notification from the new "source resource," the host of Destination Resource 2 updates the source resource and binding URI in the binding entry.

At step 6, after updating the binding entry, the host of Destination Resource 2 sends a response to Destination Resource 1 with the URI of the new link binding.

At step 7, the host of Destination Resource 1 sends a notification to the original source resource (optionally including the URI of new binding), indicating that the binding with Destination Resource 2 has been updated.

Additionally or alternatively, the decision of leveraging Destination 1 as a relay to Destination 2 may be made by the LBC. In step 2, instead of the SRH, the LBC may send the request to Destination 1 and trigger the next steps.

Figure 7:
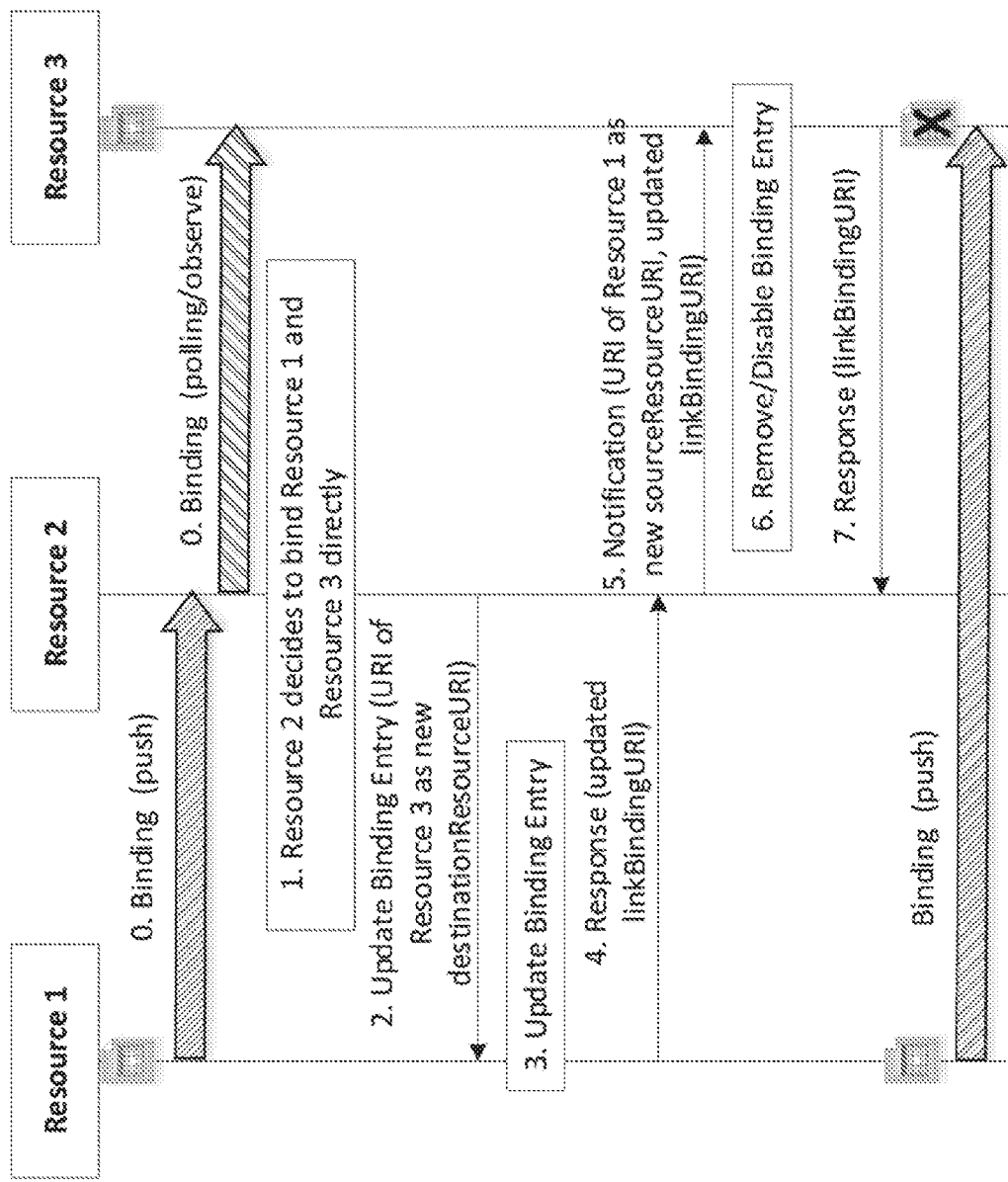
FIG. 7 shows a flow chart of an example method for binding chain compression.

A binding chain may be compressed (e.g., if one of the resources leaves the chain) thereby merging the two neighboring hops into one. For example, a vehicle (source) is collecting traffic information of an area and sharing with a road side unit (RSU) (destination resource 1), and the RSU further shares the information with the cloud (destination resource 2). When the vehicle leaves the area, the RSU no longer needs the information from the vehicle, while the cloud may still be interested in that information. In this case, the RSU may leave the binding chain and as a result, the vehicle-RSU-cloud binding chain is compressed to a vehicle-cloud binding. Generally, if one destination resource in the binding chain is no longer interested in the source resource, it may directly connect the two neighbor resources and quit the chain. If all the intermediate resources are removed, the binding chain can be compressed to an ordinary one-hop binding. The compression of binding chain can be viewed as the reverse process of forming or extending the binding chain. Combining them may enable the binding chain to dynamically adjust the number of hops between end resources and improve the efficiency of multiple bindings. An example method of binding chain compression is shown in FIG. 7 and described further below.

At step 0, a binding chain has been set up connecting Resource 1 to 3. A "Push" link binding has been established from Resource 1 to Resource 2, and a "Polling/Observe" link binding has been established from Resource 2 to Resource 3.

At step 1, Resource 2 decides to link Resource 1 and Resource 3 directly by compressing the two-hop binding into a one-hop "Push" binding.

At step 2, Resource 2 sends a request to Resource 1 to update the destination in the binding entry to Resource 3.

At step 3, Resource 1 updates the destination and binding URI in the binding entry after receiving the request from Resource 2.

At step 4, after updating the binding entry, Resource 1 sends a response to Resource 2 along with the new binding URI indicating that the binding entry has been updated.

At step 5, upon receiving the response from Resource 1, Resource 2 further sends a notification to Resource 3, indicating that Resource 3 will be bound with Resource 1 directly with "Push" method, replacing the binding with Resource 2. The notification may also contain the URI of the new link binding.

At step 6, since Resource 3 no longer needs to poll from Resource 2, Resource 3 may remove or disable the binding entry corresponding to the binding with Resource 2.

At step 7, the host of Resource 3 sends a response to the host of Resource 2, indicating the binding chain compression has been completed.

A dynamic environment may affect the efficiency of the binding method in an existing link binding. For example, a change in the number of destination resources, number of link bindings associated with a resource, capability of storage, power level, or mobility may all affect the preference of binding method in terms of efficiency and feasibility of the link binding. While binding attributes (such as period and condition) can be updated with the existing update procedures, the binding method cannot be changed once the binding is created. In accordance with a second aspect of the disclosure, procedures for dynamically switching the binding method are disclosed.

Figure 8:
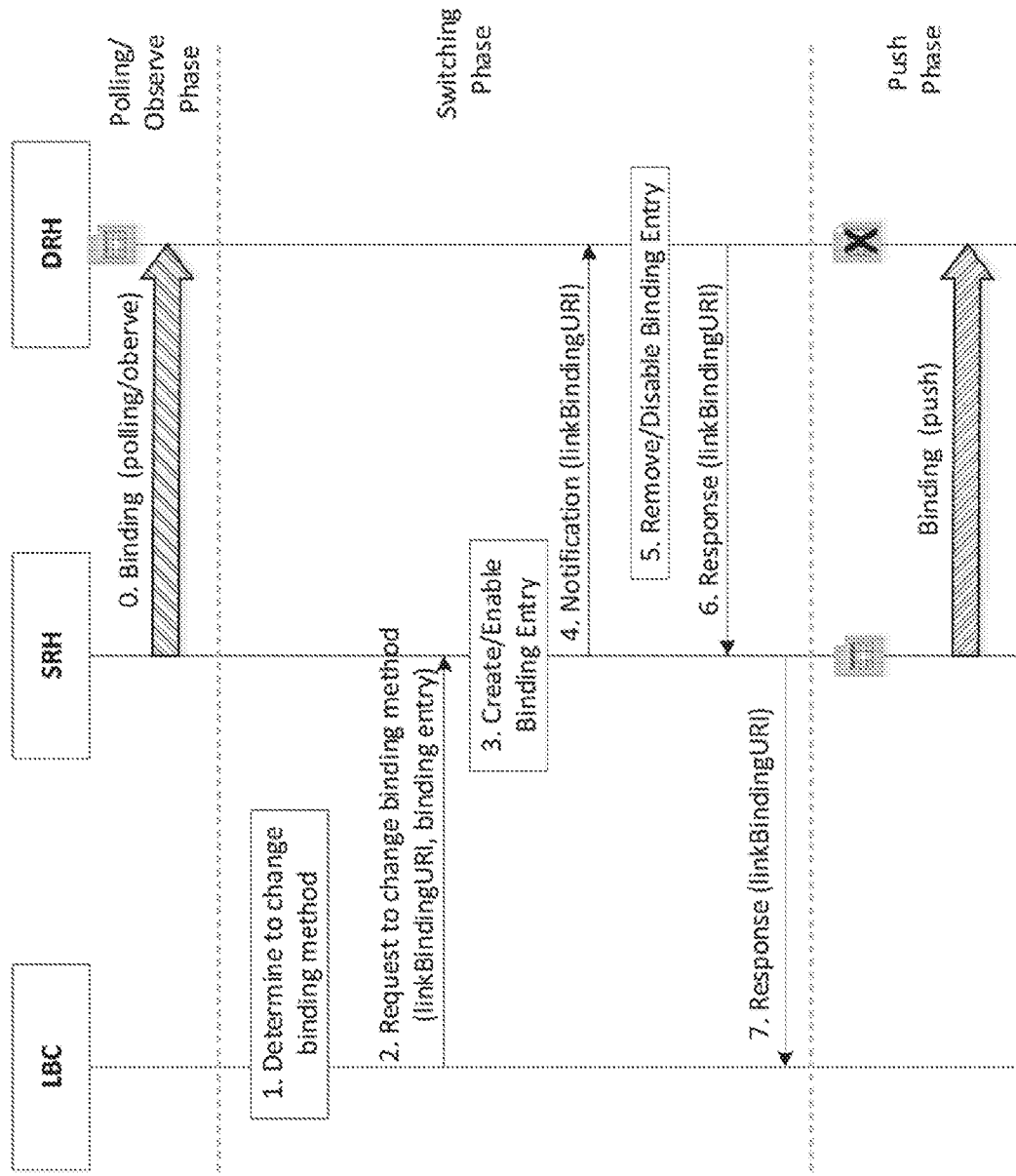
FIG. 8 shows a flow chart of an example method for binding method switching from Polling/Observe to Push that is initiated by a LBC.

FIG. 8 shows an example procedure for switching a binding method from "Polling/Observe" to "Push" when initiated by the LBC.

At step 0, a "Polling/Observe" link binding between a source resource and a destination resource has been established, and the binding entry is maintained at the DRH.

At step 1, the LBC determines to change the binding method from "Polling/Observe" to "Push." For example, the LBC may discover more incoming source resources to be bound to the DRH that require "Polling" method while the DRH has little remaining storage space for more binding entries. Another example would be that the SRH has or may become mobile and the LBC determines to switch to the more suitable "Push" method. Note that the LBC may be located at the same node as the SRH or DRH.

At step 2, the LBC sends the request for changing the binding method to the SRH. The URI of the existing link binding may be contained in this request and all the following messages to indicate which binding is switching the binding mode. Since the SRH may need to create a new binding entry after the switch, the request may also contain the corresponding binding entry. If there are multiple bindings between the SRH and DRH and all of them need to switch the binding method, a combined request can be sent to the SRH together with the corresponding binding entries.

At step 3, after receiving the switching request, the SRH creates a new binding entry (or binding entries if multiple bindings are affected). In a dynamic environment, it is possible that the binding method has been switched previously, which means the binding used to be in "Push" method and the SRH keeps a disabled binding entry. In this case, the SRH does not need to create a new entry, but enables the corresponding binding entry.

At step 4, after the new binding entry is ready, the SRH sends a notification to the DRH indicating that the binding method will be changed to "Push."

At step 5, since the DRH no longer needs to maintain the binding entry after switching to "Push" method, the DRH can remove the corresponding binding entry. In one example, the DRH may temporarily disable the binding entry in case the binding method is switched back to "Polling/Observe" at a later time.

At step 6, the DRH sends a response to the SRH, notifying the latter that the switching has been done on the DRH. In the case that the DRH does not agree with switching the binding method, the response may instead indicate the rejection of switching (and may indicate the reason why).

At step 7, after receiving the response from the DRH, the SRH sends a response to the LBC, indicating that the switch has been completed. The response may also include the URI of the binding. If the switching is rejected by the DRH, the SRH may forward the rejection response received in step 6 to the LBC.

As an alternative to FIG. 8, the LBC may send the switching request to DRH in step 2, then the DRH may send a request (together with the binding entry) to the SRH to create binding entry. Steps 3 and 5 may remain unchanged, step 6 may be removed, and step 7 may be changed to be sent from the DRH.

Figure 9:
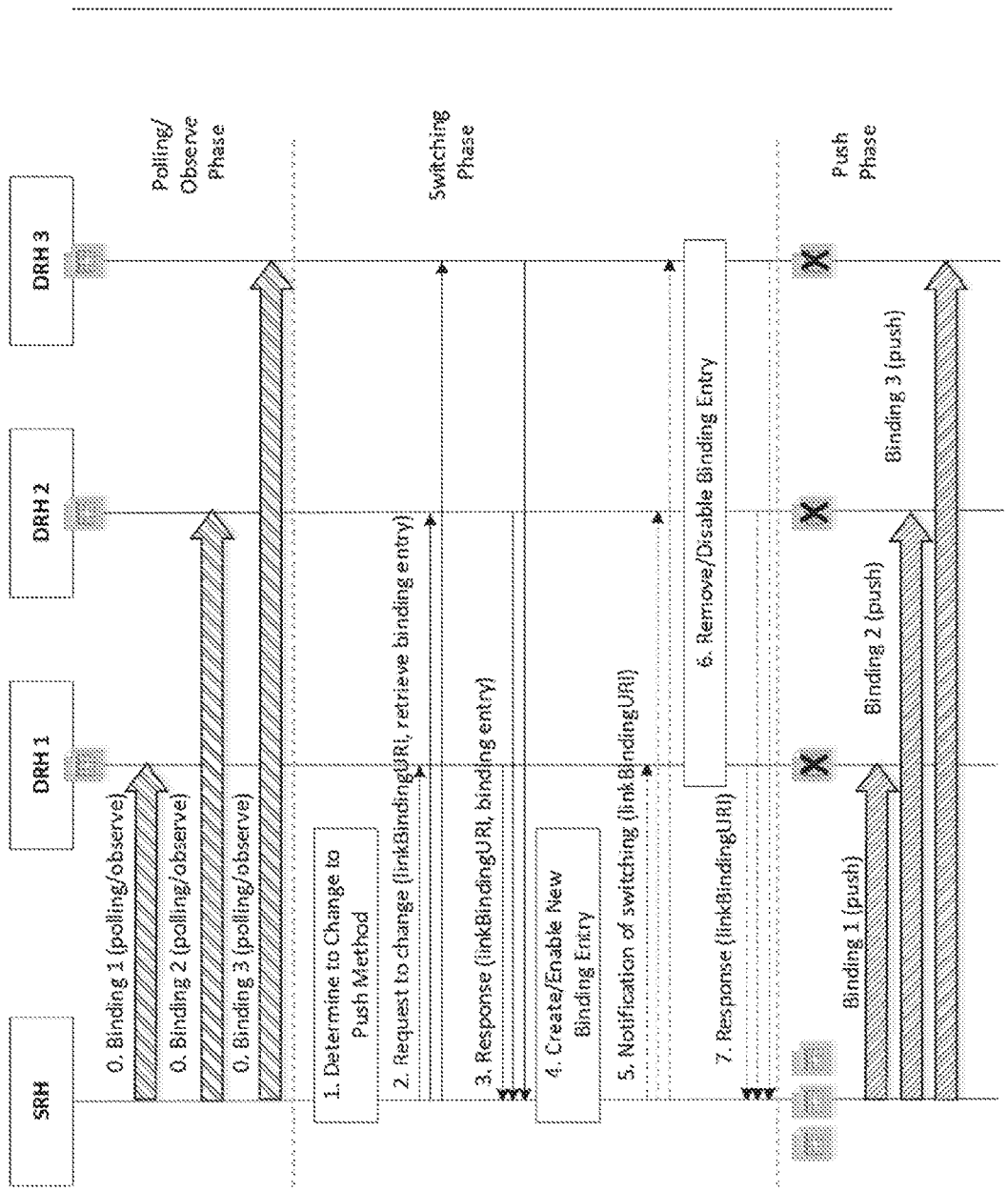
FIG. 9 shows a flow chart of an example method for binding method switching from Polling/Observe to Push that is initiated by a SRH.

FIG. 9 shows an example procedure for switching a binding method from "Polling/Observe" to "Push" which is initiated by the SRH, assuming SRH knows the DRHs through the stored binding information (not binding entries). The source resource may be bound to multiple destination resources, and the switching may apply to one, several, or all of the corresponding bindings.

At step 0, "Polling/Observe" link bindings between a source resource and multiple destination resources have been established and a binding entry is maintained at each DRH.

At step 1, the SRH determines to change the binding method from "Polling/Observe" to "Push" for multiple existing bindings (binding 1 to 3 in the figure). For example, as the number of destination resources increases, the SRH may find it more efficient to switch to "Push" method by leveraging multicast.

At step 2, the SRH sends the request for changing the binding method to each DRH. The URI of the link binding may be contained in the request (and in one or more of the request/response messages in the following steps) to indicate which binding is switching the binding mode. Since the SRH may need to create new binding entries after the switch, the request may also ask to retrieve the binding entries at the DRHs. The request messages can also be embedded to the notification messages and be sent to the DRHs during content synchronization.

At step 3, after receiving the request from the SRH, the DRHs send responses to the SRH. If the SRH has asked to retrieve the binding entry, the response may also include the binding entry.

At step 4, the SRH creates the new binding entry. If the SRH has the corresponding disabled binding entries, then the entries may be enabled.

At step 5, after the binding entry is created/enabled, the SRH sends a notification to each of the DRHs indicating that the switching has been completed (note that this step may be optional).

At step 6, the DRHs may remove the corresponding binding entries. Additionally or alternatively, instead of removing, the DRH may temporarily disable the binding entry in case the binding method is switched back to "Polling/Observe" at a later time.

At step 7, if the DRH received a notification in step 5, a corresponding response may be sent to the SRH.

Figure 10:
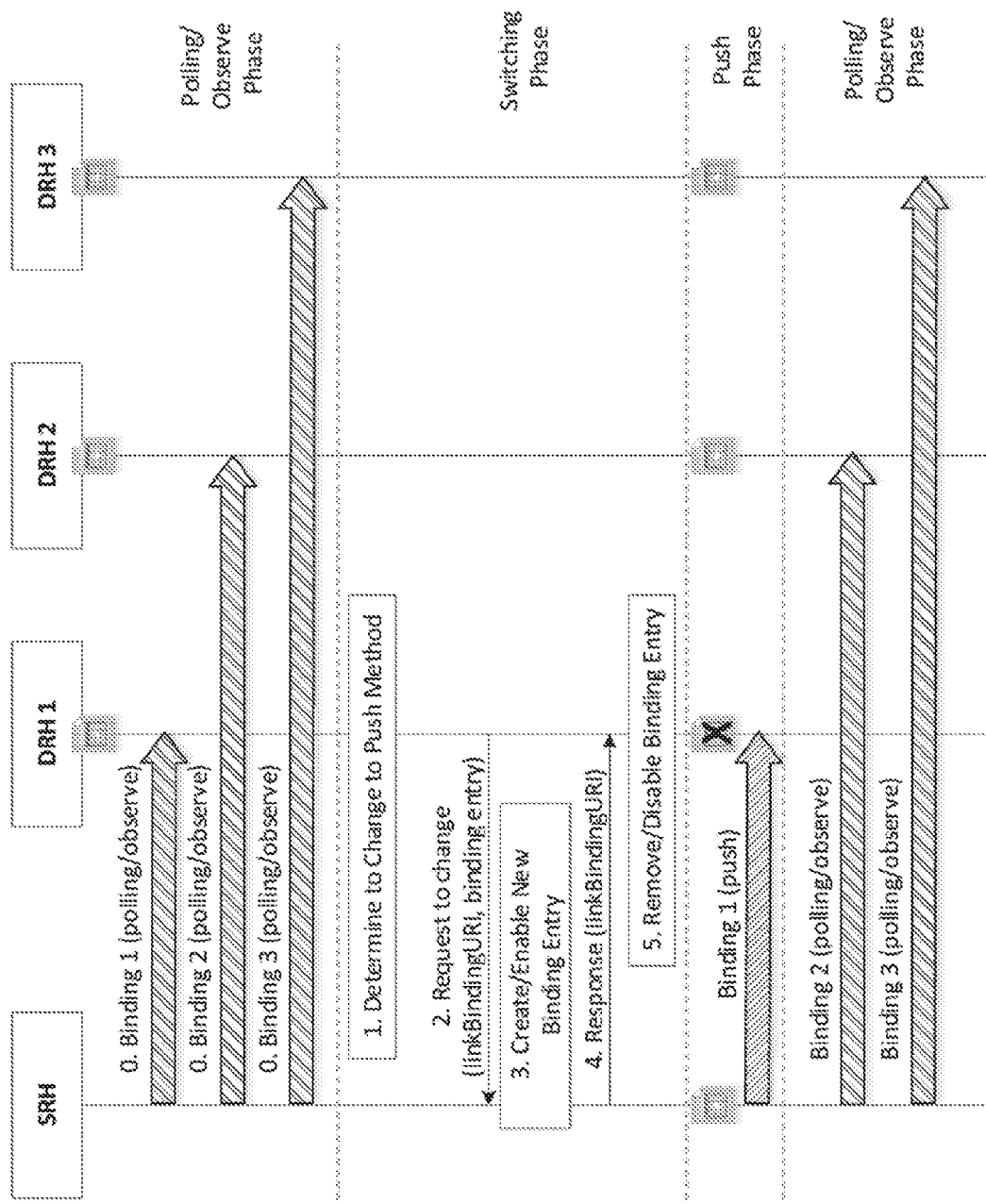
FIG. 10 shows a flow chart of an example method for binding method switching from Polling/Observe to Push that is initiated by a DRH.

FIG. 10 shows an example procedure for switching a binding method from "Polling/Observe" to "Push" which is initiated by the SRH.

At step 0, "Polling/Observe" link bindings between a source resource and multiple destination resources have been established and a binding entry is maintained at each DRH.

At step 1, one DRH determines to change the binding method from "Polling/Observe" to "Push" (Binding 1 in the figure). For example, if DRH 1 becomes low in storage and is no longer able to maintain the binding entry, then DRH 1 may want to switch to "Push" method. Another example would be if DRH 1 switched from "Push" to "Polling" binding at a previous time due to its mobility, but later DRH 1 becomes stationary and wants to switch back to "Push" method.

At step 2, the DRH sends the request for changing the binding method to the SRH. The URI of the existing link binding may be contained in this request (and in one or more of the request/response messages in the following steps) to indicate which binding is switching the binding mode. The request may include the corresponding binding entry that was kept at this DRH, so that the SRH may create a new binding entry based on this. The request messages may be embedded to the polling messages and sent to the SRH during content synchronization.

At step 3, the SRH creates the new binding entry. If the SRH has the corresponding disabled binding entry, then the entry may be enabled.

At step 4, the SRH sends a response to the DRH, notifying the latter that the switching has been done at the SRH.

At step 5, the DRH may remove the corresponding binding entry. Alternatively, instead of removing, the DRH may temporarily disable the binding entry in case the binding method is switched back to "Polling/Observe" in a later time.

Figure 11:
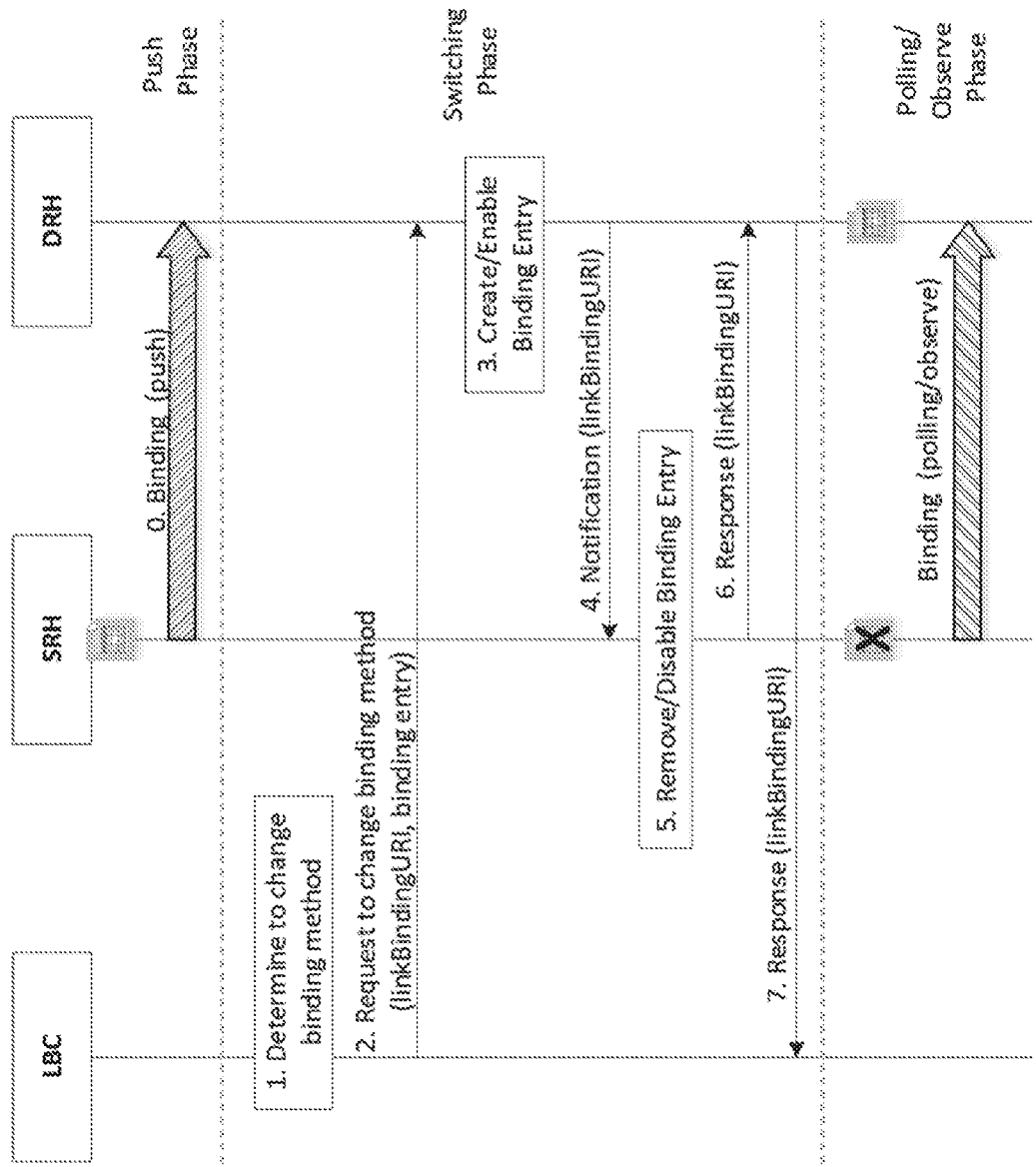
FIG. 11 shows a flow chart of an example method for binding method switching from Push to Polling/Observe that is initiated by a LBC.

FIG. 11 shows an example procedure for switching from a "Push" method to a "Polling/Observe" method that is initiated by the LBC.

At step 0, a "Push" link binding between a source resource and a destination resource has been established and the binding entry is maintained at the SRH.

At step 1, the LBC determines to change the binding method from "Push" to "Polling/Observe." For example, the LBC may discover more incoming destination resources to be bound to the SRH that require "Push" method while the SRH has little remaining storage space for more binding entries. Another example would be that the DRH may become mobile and the LBC determines to switch to the more suitable "Polling/Observe" method.

At step 2, the LBC sends the request for changing the binding method to the DRH. The URI of the existing link binding may be contained in this request and all the following messages to indicate which binding is switching the binding mode. Since the DRH may need to create a new binding entry after the switch, the request may also contain the corresponding new binding entry. If there are multiple bindings between the SRH and DRH and all of them need to switch binding method, a combined request can be sent to the DRH together with the corresponding binding entries. Note that the LBC may be located at the same node as the SRH or DRH.

At step 3, after receiving the switching request, the DRH creates a new binding entry (or binding entries if multiple bindings are affected). In a dynamic environment, it is possible that the binding method has been switched previously, which means the binding used to be in "Polling/Observe" method and the DRH keeps a disabled binding entry. In this case, the DRH does not need to create a new entry, but enables the corresponding binding entry.

At step 4, after the new binding entry is ready, the DRH sends a notification to the SRH indicating that the binding method will be changed to "Polling/Observe."

At step 5, since the SRH no longer needs to maintain the binding entry after switching to "Polling/Observe" method, the SRH can remove the corresponding binding entry. Alternatively, instead of removing, the SRH may temporarily disable the binding entry in case the binding method is switched back to "Push" in a later time.

At step 6, the SRH sends a response to the DRH, notifying the latter that the switching has been done on the SRH. In the case that the SRH does not agree with switching the binding method, the response may instead indicate the rejection of switching (and the reason).

At step 7, after receiving the response from the SRH, the DRH sends a response to the LBC, indicating that the switching has been completed. The response may also include the URI of the binding. If the switching is rejected by the SRH, the DRH may forward the rejection response received in step 6 to the LBC.

As an alternative to FIG. 11, the LBC may send the switching request to SRH in step 2, then the SRH may send a request (together with the binding entry) to the DRH to create binding entry. In this example, steps 3 and 5 may remain unchanged, step 6 may be removed, and step 7 may be changed to be sent from the SRH.

Figure 12:
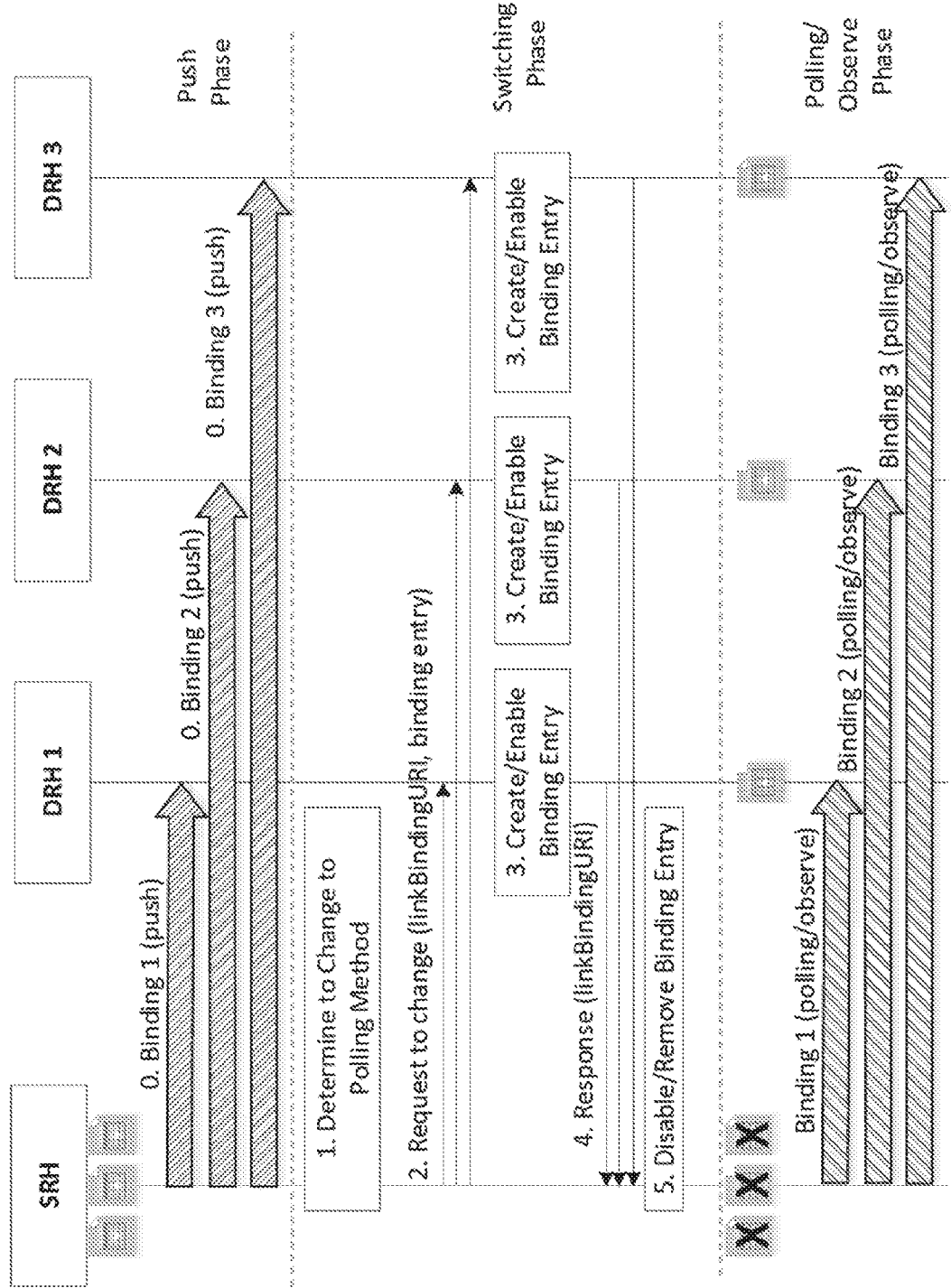
FIG. 12 shows a flow chart of an example method for binding method switching from Push to Polling/Observe that is initiated by a SRH.

FIG. 12 shows an example procedure for switching from a "Push" method to a "Polling/Observe" method that is initiated by the SRH. The source resource is bound to multiple destination resources, and the switching may apply to one, several, or all of the corresponding bindings.

At step 0, "Push" link bindings between a source resource and multiple destination resources have been established and the binding entries are maintained at the SRH.

At step 1, the SRH determines to change the binding method from "Push" to "Polling/Observe" for multiple existing bindings (Binding 1 to 3 in the figure). For example, the SRH is located on a fog node near the edge of the network with limited capability, which is bound with fog nodes in higher layers and the cloud. The SRH may offload the storage and maintenance of binding entries to the DRHs (which usually have higher capability) by switching to a "Polling/Observe" method.

At step 2, the SRH sends the request for changing the binding method to each DRH. The URI of the link binding may be contained in the corresponding request and all the following messages to indicate which binding is switching the binding mode. The request may include the corresponding binding entry that was kept at the SRH, so that the DRH may create a new binding entry based on this. The request messages can also be embedded to the push messages and sent to the DRHs during content synchronization.

At step 3, after receiving the request from the SRH, the DRH creates the new binding entry accordingly. If the DRH has the corresponding disabled binding entry, then the entry may be enabled.

At step 4, each DRH sends a response to the SRH, notifying the latter that the switching has been done at the DRH.

At step 5, the SRH may remove the corresponding binding entries. Alternatively, instead of removing, the SRH may temporarily disable the binding entry in case the binding method is switched back to "Push" in a later time.

Figure 13:
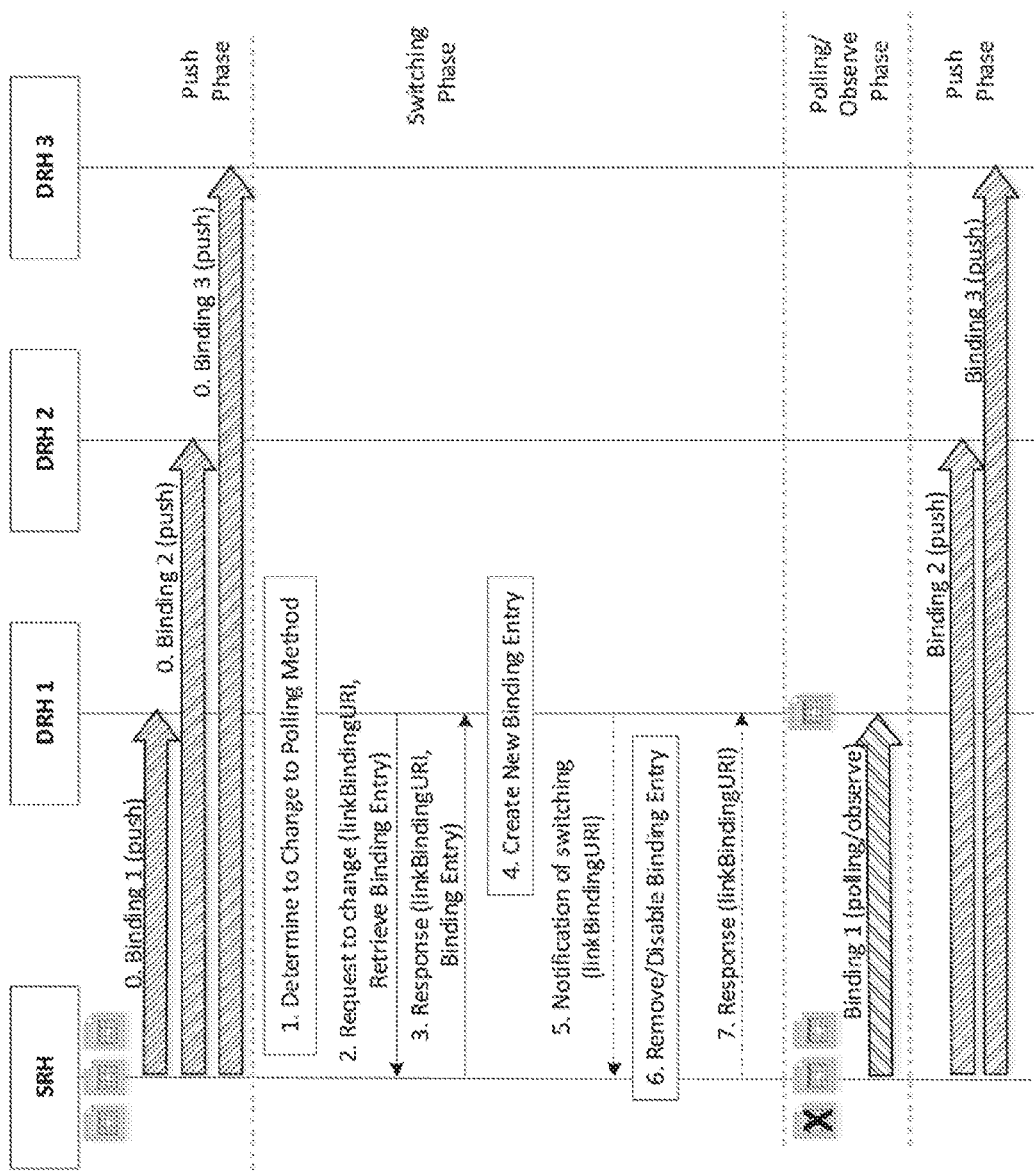
FIG. 13 shows a flow chart of an example method for binding method switching from Push to Polling/Observe that is initiated by a DRH.

FIG. 13 shows an example procedure for switching from a "Push" method to a "Polling/Observe" method that is initiated by the DRH.

At step 0, "Push" link bindings between a source resource and multiple destination resources have been established and the binding entries are maintained at the SRH.

At step 1, one DRH determines to change the binding method from the "Push" to "Polling/Observe" (Binding 1 in the figure). For example, DRH 1 originally preferred "Push" method since it did not have to maintain the binding entry. But as DRH 1 becomes low in power level and wants to apply sleeping schedule, the periodic polling method will be more suitable since DRH 1 can align the polling with its sleeping schedule.

At step 2, the DRH sends the request for changing the binding method to the SRH. The URI of the existing link binding may be contained in this request and all the following messages to indicate which binding is switching the binding mode. Since the DRH may need to create a new binding entry after the switch, the request may also ask for retrieving the corresponding binding entry at the SRH.

At step 3, after receiving the request from the DRH, the SRH sends a response to the DRH. If the DRH has asked to retrieve the binding entry, the response may also include the binding entry.

At step 4, the DRH creates the new binding entry. If the DRH has the corresponding disabled binding entries, then the entries may be enabled.

At step 5, after the binding entry is created/enabled, DRH 1 sends a notification to the SRH indicating that the switching has been completed (this step may be optional).

At step 6, the SRH may remove the corresponding binding entry associated with the switched binding. Alternatively, instead of removing, the SRH may temporarily disable the binding entry in case the binding method is switched back to "Polling/Observe" in a later time.

In accordance with a third aspect of the disclosure, a binding broker can be leveraged to enable communications between endpoints which have limited reachability. The binding broker may host the source resource instead of the SRH so that the DRH can access the source resource even when the SRH is not reachable. Note that for consistency in representation, the term SRH (source resource host) is continued to be used to stand for the source endpoint, although the source resource may be hosted in the binding broker. The binding broker changes the role of SRH in the binding since the source resource is hosted in the broker, while the context information of the source resource is still generated at the SRH (e.g., conditions for triggering content synchronization), which may affect the procedures of link binding management. In other words, the SRH and the broker in the broker assisted binding may act together as the role of SRH in a normal binding relationship. In a broker assisted binding, the SRH may be responsible for setting or verifying binding attributes according to its context information, but may not be involved in content synchronization, which may be conducted between the broker and DRH instead.

Five major steps are involved in existing link binding management. Table 2 shows the differences in these steps after the binding broker is introduced in the binding.

TABLE 2

Differences in Major Steps after Introducing Binding Broker

| | Existing Baseline Link Binding Management | Broker Assisted Link Binding Management |
|---|---|---|
| Major Steps | Resource creation with binding support or resource registration with binding hint; Resource discovery for link binding; | Binding broker is not involved in this step, no difference in procedures; Minor modifications: add binding broker to be discovered; |
| | Link binding creation (and registration); | Detailed below in connection with FIGS. 14-18. |
| | Binding-aware content synchronization; | Replace SRH by binding broker; |
| | Link binding operations (including update, suspension, restoration, cancellation). | Detailed below in connection with FIGS. 19 and 20. |

Figure 14:
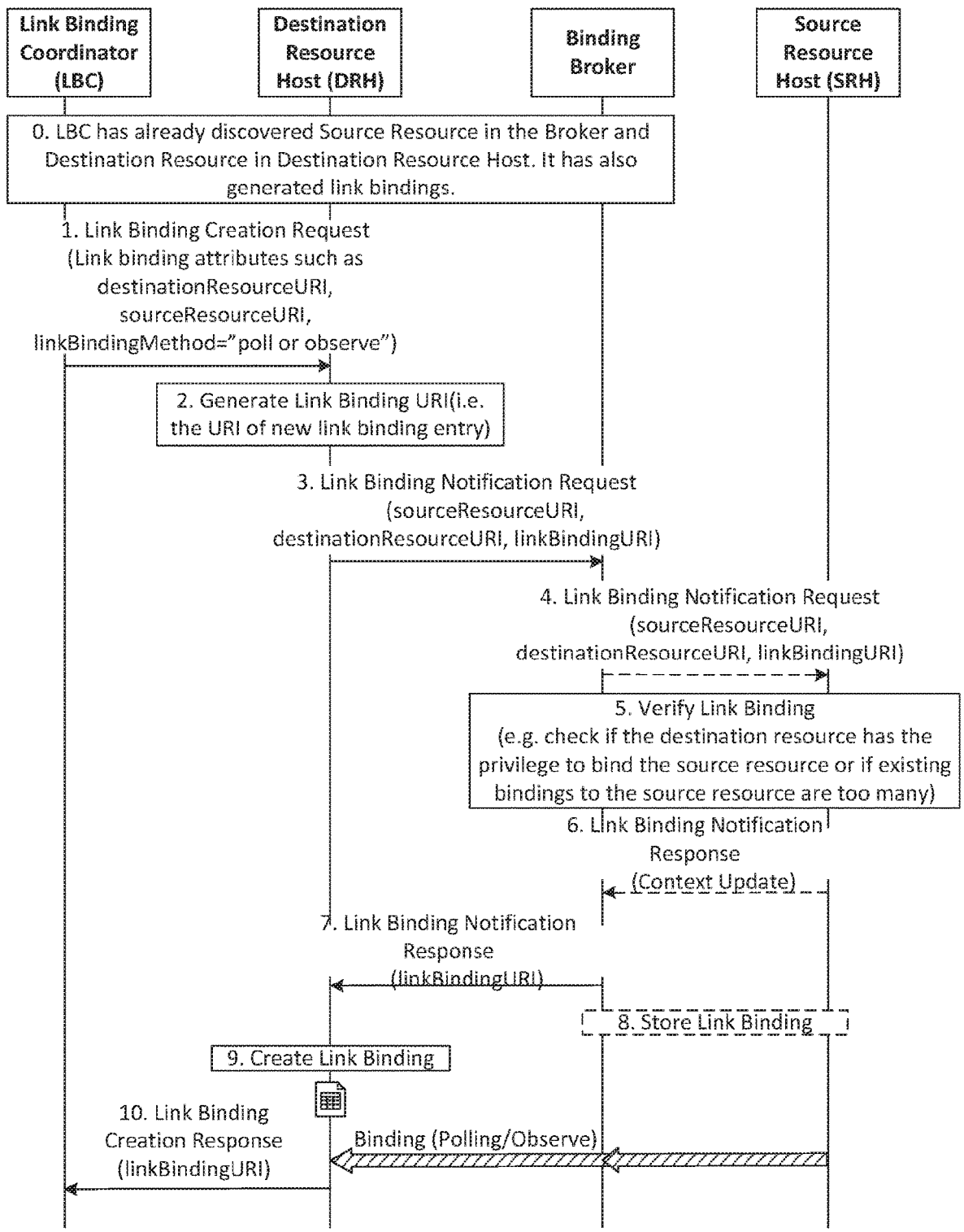
FIG. 14 shows a flow chart of a first example method for broker assisted binding creation using Polling/Observe.
Figure 15:
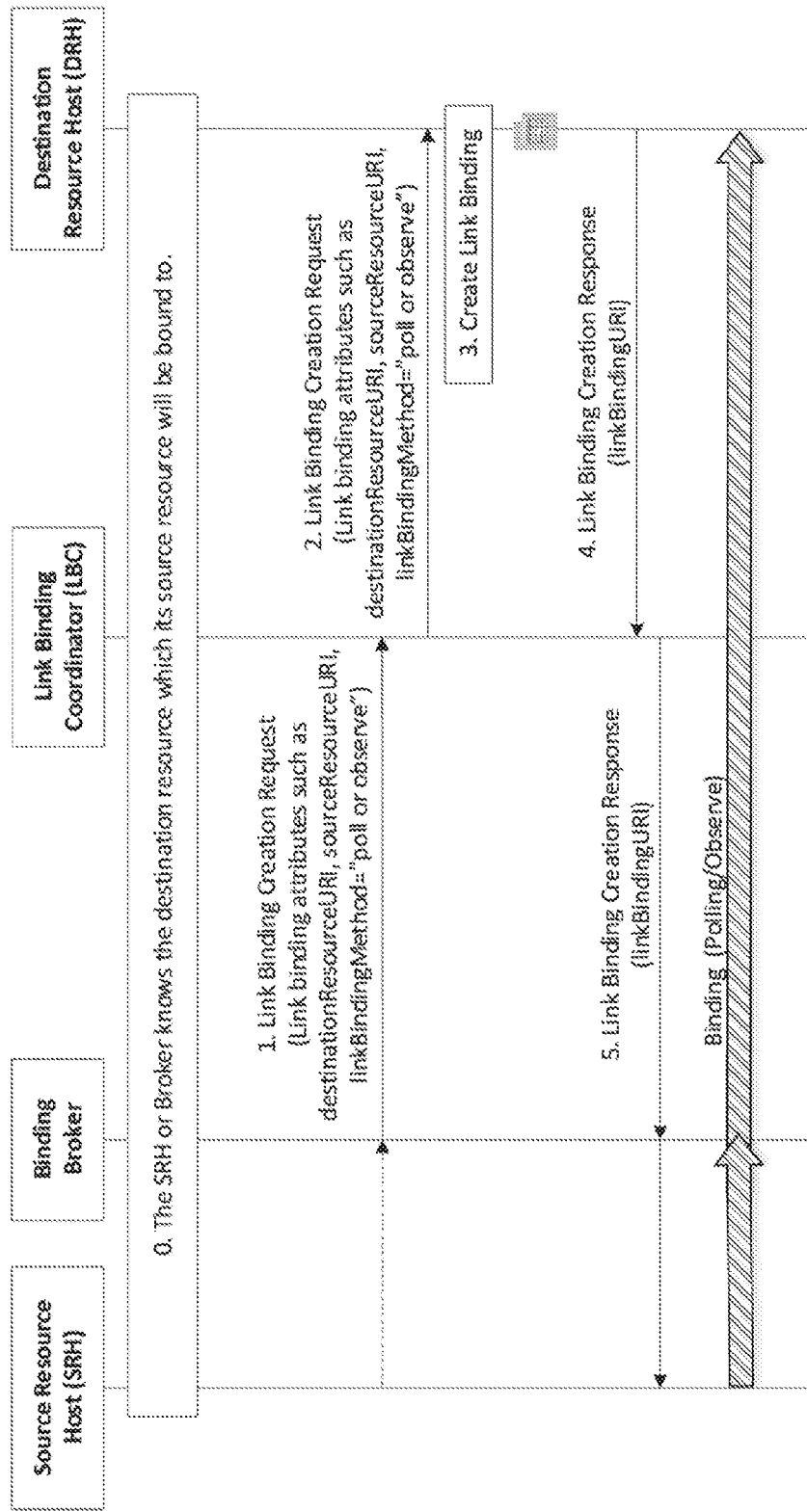
FIG. 15 shows a flow chart of a second example method for broker assisted binding creation using Polling/Observe.
Figure 16:
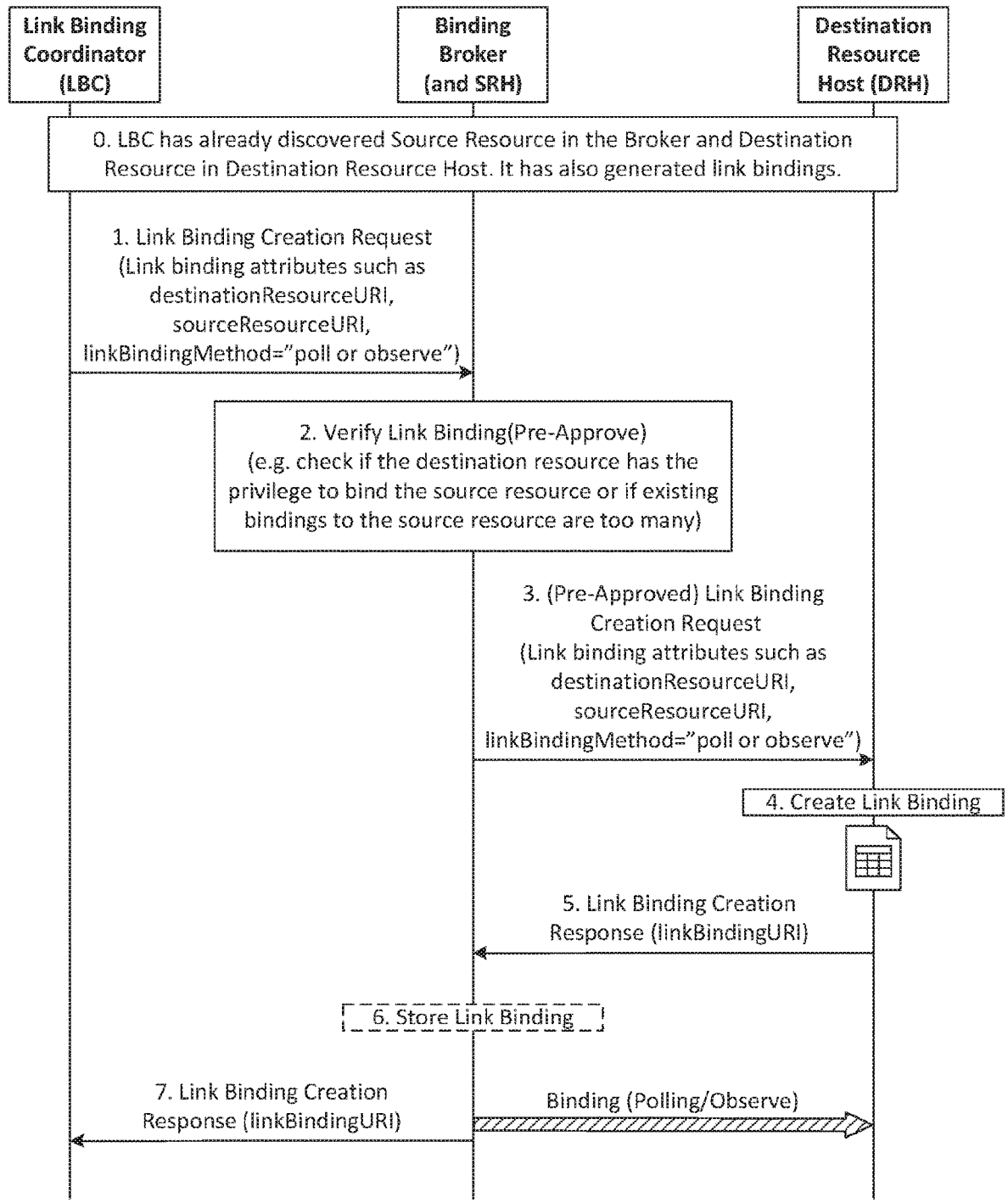
FIG. 16 shows a flow chart of a third example method for broker assisted binding creation using Polling/Observe.
Figure 17:
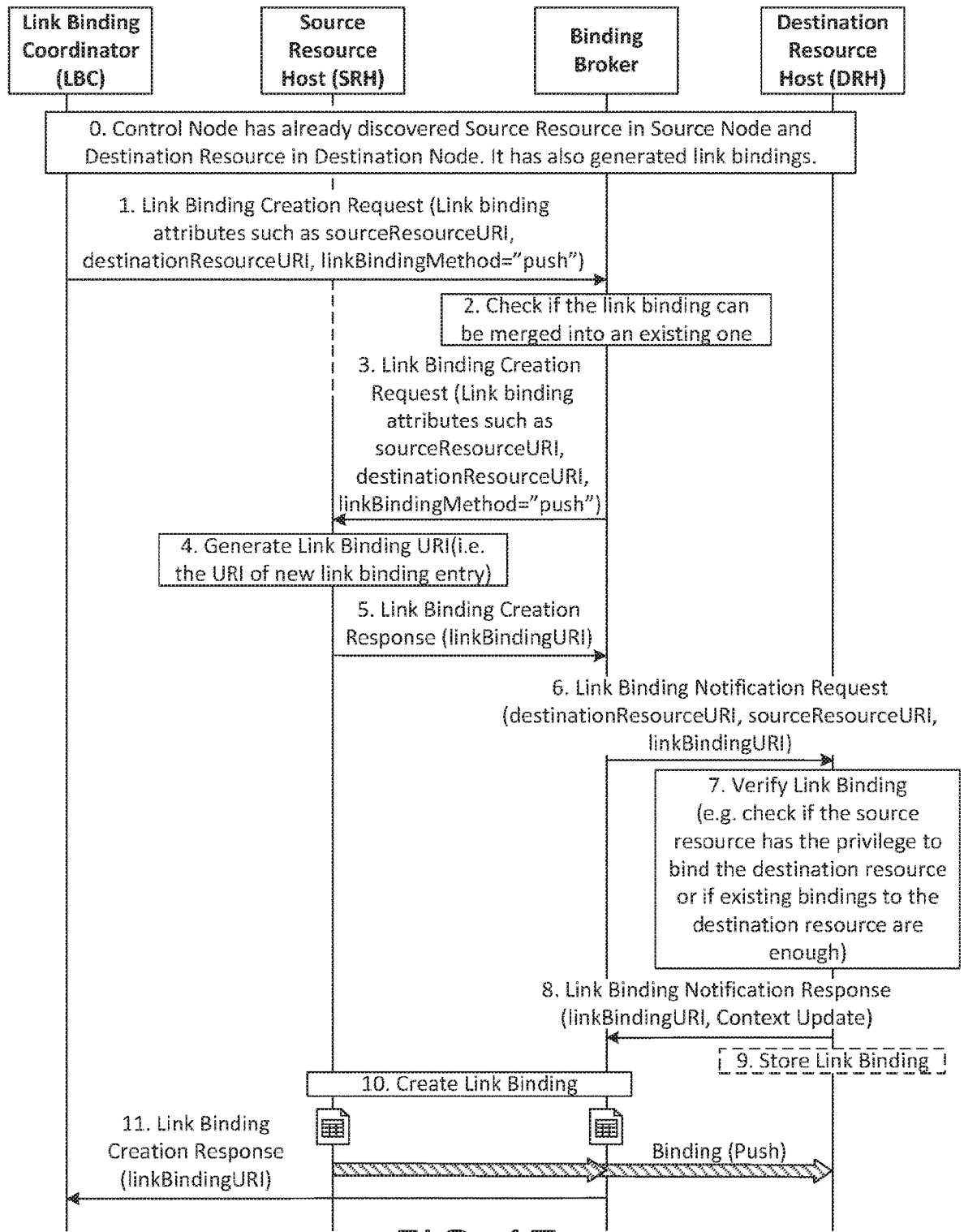
FIG. 17 shows a flow chart of a first example method for broker assisted binding creation using Push.
Figure 18:
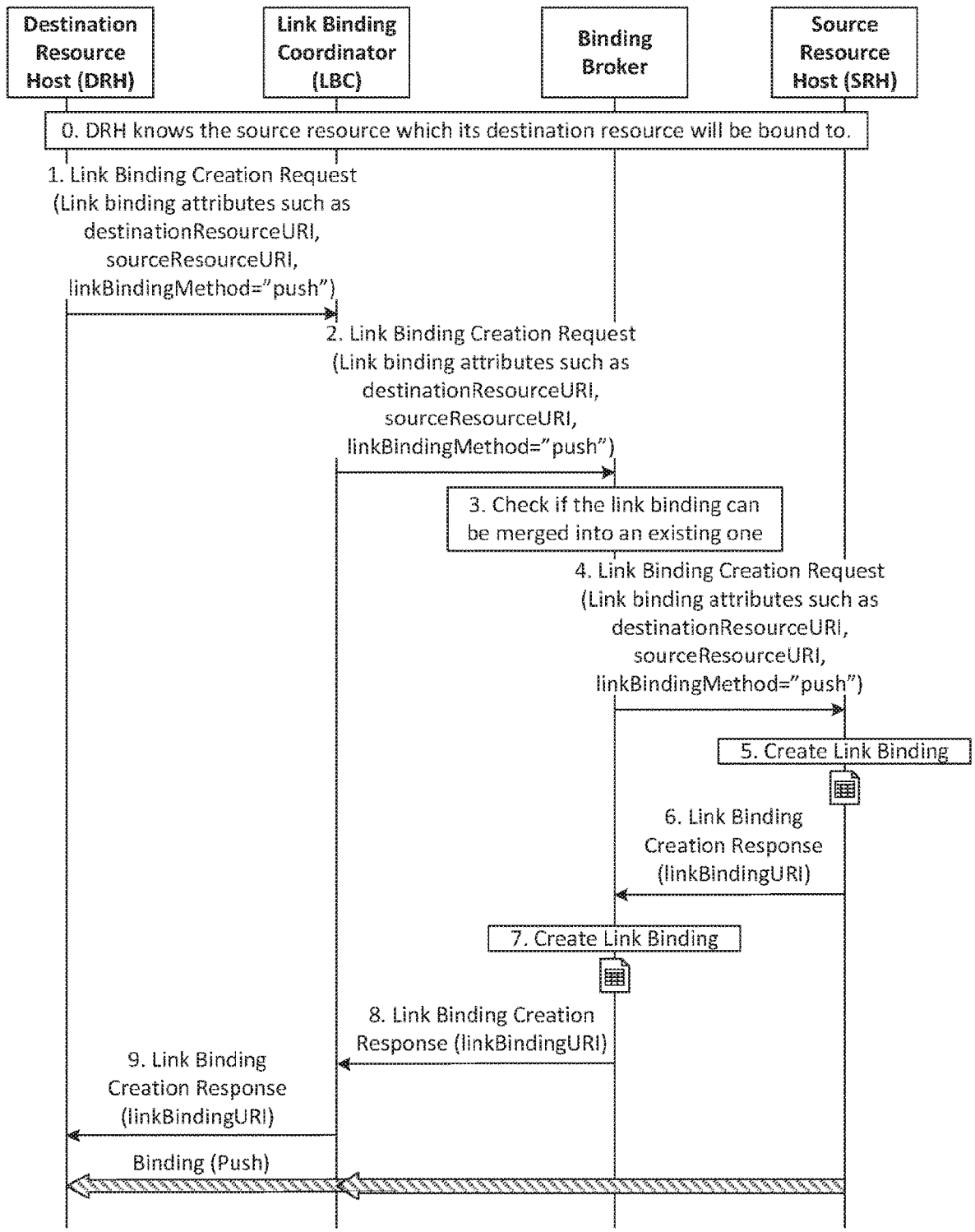
FIG. 18 shows a flow chart of a second example method for broker assisted binding creation using Push.

The procedures described for broker assisted binding may differ depending on the binding method, whether the LBC can directly reach the DRH without going through the binding broker, and/or whether the resource to be bound to is known. FIG. 14, FIG. 15 and FIG. 16 show the procedures for creating "Polling/Observe" link binding with a broker, while FIG. 17 and FIG. 18 show the procedures for a "Push" binding creation. Note that some detailed descriptions are omitted since they are similar to those in the existing baseline procedures.

For a "Polling/Observe" binding method, if the LBC can reach the DRH directly, or the LBC and DRH are located on the same node, then the procedures are shown in FIG. 14.

At step 0, assume that the LBC has already discovered a source resource in the binding broker and a destination resource in DRH. The LBC has also generated some link bindings or has obtained certain link binding recommendations.

At step 1, the LBC sends a link binding creation request to the DRH. This message requests to create a new link binding entry at the DRH and contains binding attributes such as the URIs of the source and destination resource and the binding method. Note that the sourceResourceURI may point to the source resource hosted on the binding broker.

At step 2, the DRH generates the linkBindingURI for the link binding entry to be created. The link binding entry is not created yet since the DRH may first check with the broker.

At step 3, the DRH sends a link binding notification request to the binding broker, including the binding attributes in step 1 and the linkBindingURI generated in step 2. The notification may inform the broker that a link binding entry may be created at the DRH, and the binding is associated with a source resource hosted at the binding broker. The notification may additionally or alternatively request the binding broker or SRH to verify and approve the link binding to be created.

At step 4, if the verification of link binding is done at the SRH and not the binding broker, then the binding broker may need to further forward the link binding notification request to the SRH.

At step 5, the binding broker or the SRH verifies the link binding notification request received in step 3 (if the binding broker is the verifier) or step 4 (if the SRH is the verifier), such as the privilege of destination resource, whether there are too many bindings with the same source resource, whether the binding attributes are appropriate, etc.

At step 6, if the verification is done at the SRH, the SRH sends a link binding notification response to the binding broker, which is to be forwarded back to the DRH. If the SRH has made any change of context information for the binding (e.g., SRH's sleep schedule) and it is necessary to notify the binding broker, then the update can be sent along in the response.

At step 7, the binding broker sends (if binding broker is the verifier) or forwards (if SRH is the verifier) the link binding notification response to the DRH, indicating whether the link binding request is approved. The response may contain the linkBindingURI of the approved link binding.

At step 8, if the link binding notification request was approved, optionally, the SRH and/or the binding broker may store the binding information locally in different forms other than binding entry. For example, the broker may store the information of a polling binding with DRH 1 (the binding entry is maintained at DRH 1). After receiving a new binding request from DRH 2, the broker is able to redirect the request to DRH 1 such that DRH 2 can bind with DRH 1 instead of the broker and SRH, forming a cascaded binding chain.

At step 9, the DRH receives the response from the binding broker. If the request gets approved, the DRH now creates the link binding entry.

At step 10, the DRH sends a link binding creation response to the LBC containing the linkBindingURI if the binding has been successfully created, or the reason of being rejected.

If the SRH or the binding broker knows the destination resource which the source resource will be bound to, the SRH or binding broker may instruct a LBC to create a link binding at a DRH. As shown in the example of FIG. 15, the LBC can be co-located with either the DRH or the binding broker.

At step 0, assume that the SRH or the binding broker knows the destination resource which the source resource will be bound to.

At step 1, the SRH or binding broker sends a link binding creation request to the LBC, including binding attributes such as the URIs of the source and destination resources and the binding method. Note that the sourceResourceURI may point to the source resource hosted on the binding broker. In case the SRH cannot reach the LBC, the request may be sent to the broker and forwarded to the LBC. It is also possible that the binding broker already knows the DRH for the destination resource to be bound. In this case, the broker may directly send the link binding creation request to the DRH, bypassing the LBC.

At step 2, the LBC receives the request, identifies the DRH, and forwards the request to the DRH.

At step 3, the DRH creates the link binding entry according to the parameters contained in the request.

At step 4, the DRH sends a link binding creation response to the LBC. If the request is received from the Broker directly, then the response may be sent to the binding broker, and an optional notification can be sent to the LBC. The response may contain the linkBindingURI of the created link binding.

At step 5, the LBC forwards the link binding creation response to the binding broker and the SRH.

If the LBC cannot reach DRH directly but has to contact DRH through the binding broker, or the LBC is located on the same node as that of the broker, the procedures for creating a "Polling/Observe" binding are presented in FIG. 16.

At step 0, assume that the LBC has already discovered the source resource in the binding broker and the destination resource in DRH. The LBC has also generated some link bindings or has obtained certain link binding recommendations.

At step 1, since the LBC cannot reach the DRH directly, the LBC sends a link binding creation request to the binding broker. This message requests to create a new link entry at the DRH and contains binding attributes such as the URIs of the source and destination resources and the binding method. Note that the sourceResourceURI may point to the source resource hosted on the binding broker.

At step 2, since the binding broker receives the link binding creation request ahead of the DRH, the binding broker may perform the verification to pre-approve the request. If the verification is to be done at the SRH or at both the broker and the SRH, then the binding broker may forward the request to the SRH. The procedures for verification are the same as steps 4-6 in FIG. 14.

At step 3, if the link binding creation request passes the verification, the pre-approved request may be forwarded to the DRH.

At step 4, the DRH receives the pre-approved link binding creation request and creates the link binding entry.

At step 5, after creating the link binding entry, the DRH sends a link binding creation response to the binding broker, including the newly generated linkBindingURI.

At step 6, the binding broker and/or the SRH may store the binding information locally in different forms other than binding entry.

At step 7, the binding broker sends a link binding creation response to the LBC, containing the linkBindingURI if the binding has been successfully created, or the reason of being rejected.

For the LBC to create a "Push" binding, instead of SRH, the LBC may first contact the binding broker, as shown in FIG. 17. Note that in this case, the LBC and the binding broker can be located on the same node.

At step 0, assume that the LBC has already discovered the source resource in the binding broker and the destination resource in the DRH. The LBC has also generated some link bindings or has obtained certain link binding recommendations.

At step 1, the LBC sends a link binding creation request to the binding broker. This message requests to create a new link entry at the SRH and contains binding attributes such as the URIs of the source and destination resources and the binding method. Note that the sourceResourceURI may point to the source resource hosted on the binding broker.

At step 2, the binding broker checks if the requested new binding entry can be merged into the existing ones. If the new request is targeting on a source resource that already exists in one of the binding entries and the corresponding binding attributes are the same, then the broker does not need to notify the SRH to create a new entry. In this case, step 3, step 4 and step 5 can be skipped.

At step 3, the binding broker generates a new link binding creation request, which is sent to the source resource in the SRH. The new request may have the same values as those in the original request from the LBC, but the URI of the destination resource may be replaced by the URI of the source resource in the binding broker.

At step 4, the SRH generates a URI for the link binding entry to be created. The link binding entry is not created yet since the SRH needs to wait for the binding broker to check with the DRH.

At step 5, the SRH sends a link binding creation response to the binding broker, including the newly generated linkBindingURI.

At step 6, the binding broker sends a link binding notification request to the DRH, including the binding attributes in step 1 and the linkBindingURI generated in step 4. The notification may inform the DRH that a link binding entry will be created at the broker and the SRH, and the binding is associated with a destination resource hosted at the DRH. The notification may also request the DRH to verify and approve the link binding to be created.

At step 7, the DRH verifies the link binding notification request, such as the privilege of source resource, whether there are too many bindings with the same destination resource, whether the binding attributes are appropriate, etc.

At step 8, the DRH sends a link binding notification response to the binding broker with the corresponding linkBindingURI. If the DRH has made any change of context information for the binding (e.g., DRH's subscription information) and it is necessary to notify the binding broker, then the update can be sent along in the response.

At step 9, if the link binding notification request was approved, optionally, the DRH may store the binding information locally in different forms other than binding entry.

At step 10, the binding broker receives the response from the DRH. If the request gets approved, the binding broker now creates the link binding entry (e.g., as requested in step 1). The binding broker may also notify the SRH to create the corresponding link binding entry (e.g., as requested in step 3).

At step 11, the binding broker sends a link binding creation response to the LBC. The response may contain the linkBindingURI if the binding has been successfully created, or may contain the reason of being rejected.

If the DRH knows the source resource which the destination resource will be bound to, the procedures will be as shown in FIG. 18. In this case, the LBC can be co-located with either DRH or the binding broker.

At step 0, assume that the DRH knows the source resource which the destination resource will be bound to.

At step 1, the DRH sends a link binding creation request to the LBC, including binding attributes such as the URIs of the source and destination resources and the binding method. Note that the sourceResourceURI may point to the source resource hosted on the binding broker. If the DRH cannot reach the LBC, or the DRH already knows the binding broker or SRH for the source resource to be bound, the DRH may directly send the link binding creation request to the binding broker, bypassing the LBC.

At step 2, the LBC receives the request, identifies the binding broker and SRH, and forwards the request to the binding broker.

At step 3, the binding broker checks if the requested new binding entry can be merged into the existing ones. If so, then steps 4 to 7 can be skipped.

At step 4, the binding broker generates a new link binding creation request, which is sent to the source resource in the SRH. The new request may have the same values as those in the original request from the LBC or DRH, but the URI of the destination resource may be replaced by the URI of the source resource in the broker.

At step 5, the SRH creates the link binding entry as requested.

At step 6, the SRH sends a link binding creation response to the binding broker, including the corresponding linkBindingURI for the new binding entry. If the SRH has made any change of context information for the binding (e.g., SRH's sleep schedule) and it is necessary to notify the binding broker, then the update can be sent along in the response.

At step 7, the binding broker creates the link binding entry with the same linkBindingURI.

At step 8, the binding broker sends a link binding creation response to the LBC. The response may contain the linkBindingURI if the binding has been successfully created, or the reason of being rejected. If the request is received from the DRH directly, then the response may be sent to the DRH, and an optional notification can be sent to the LBC.

At step 9, the LBC forwards the link binding creation response to the DRH.

Figure 19:
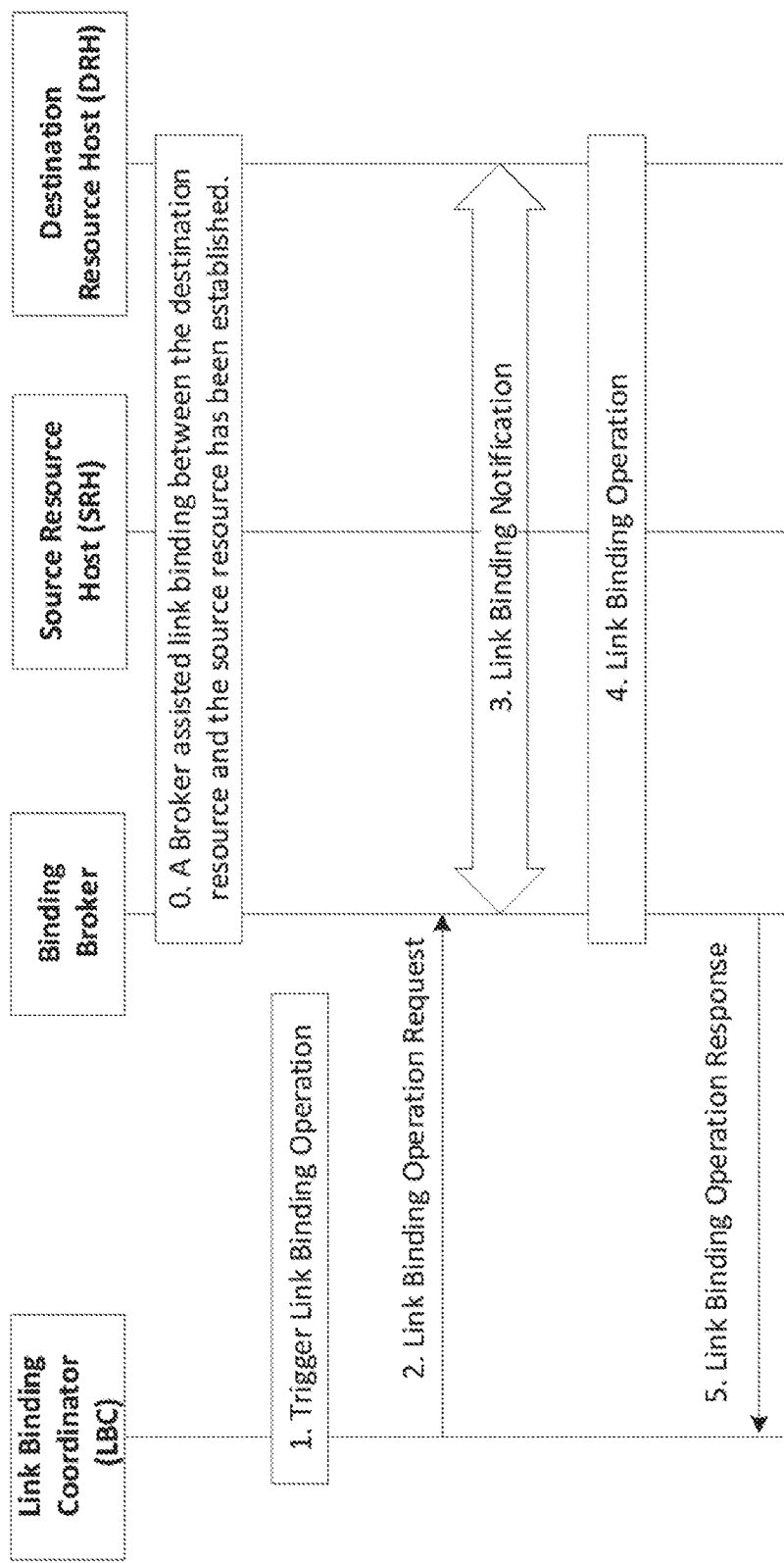
FIG. 19 shows a flow chart of example link binding operations triggered by the LBC.

The involvement of the binding broker may also change the procedures for link binding operations, including updating the attributes and resources in the link binding (update), suspending an established link binding (suspension), resuming a halted link binding (restoration), or removing an existing link binding (cancellation). If the operations are triggered by the SRH or DRH, or triggered by the LBC which can reach DRH or co-locate with DRH, then the procedures are similar to those in the baseline operations by simply adding the binding broker for forwarding messages to and from the SRH. Otherwise, if the operations are triggered by the LBC but the LBC cannot reach the DRH, then the procedures may be modified as shown in FIG. 19.

At step 0, a broker assisted link binding between a source resource and a destination resource has been established.

At step 1, the LBC triggers a link binding operation (update, suspension, restoration, or cancellation). The LBC may trigger the operation since LBC has information about all the discovered resources, based on which it may identify situations where an operation is required.

At step 2, the LBC sends a link binding operation request to the binding broker to request to perform a desired operation on an existing link binding entry. The message may contain the linkBindingURI of the link binding entry and attributes that are involved in the operation (e.g., updated values of parameters).

At step 3, the binding broker informs both the SRH and DRH of the operation that is going to be performed. Then, the SRH and DRH may send a response to the binding broker indicating whether they agree to perform the operation.

At step 4, the desired operation is performed on the corresponding entities.

At step 5, the binding broker sends a link binding operation response to the LBC, containing the status of the operation.

Figure 20:
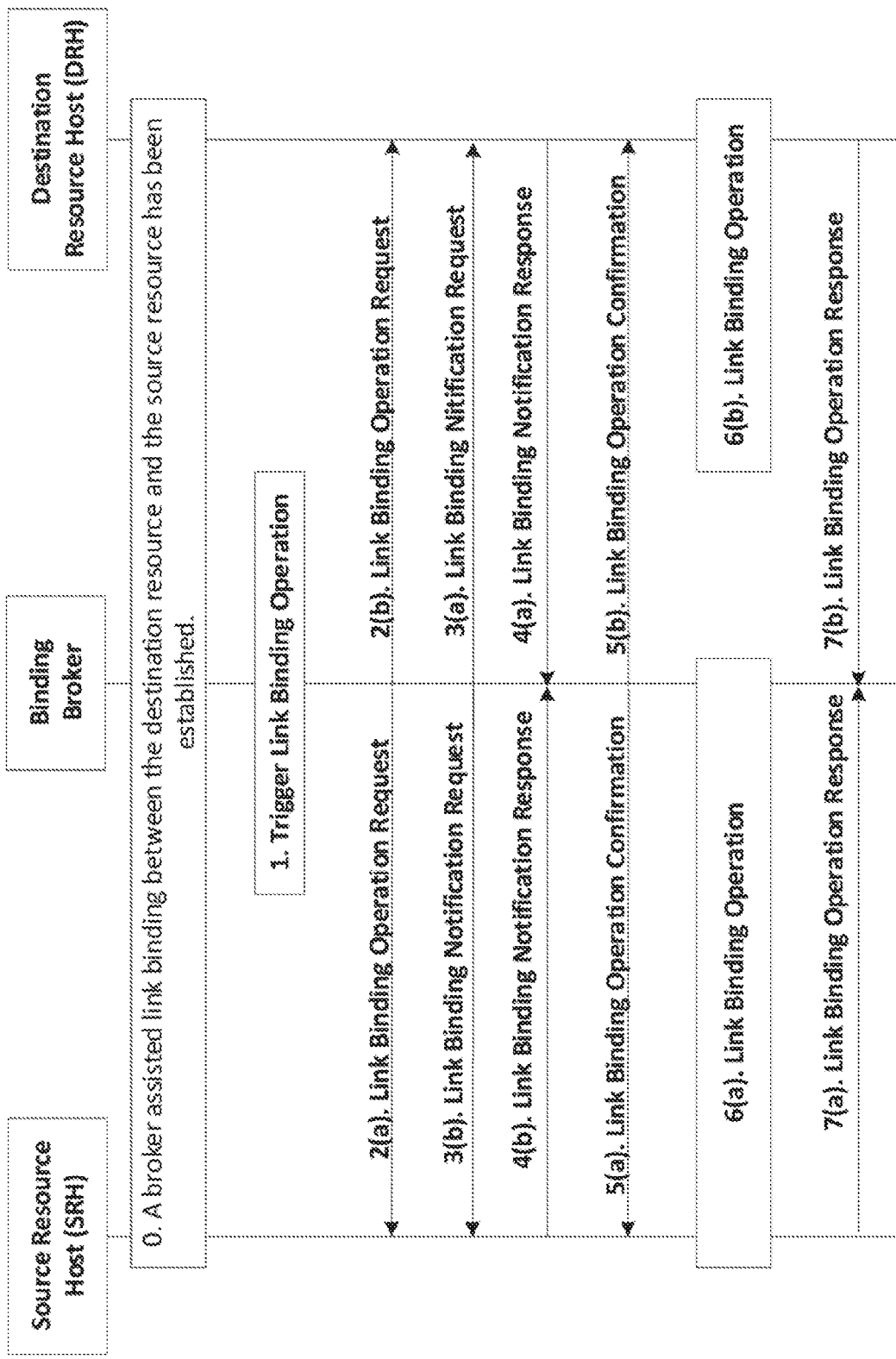
FIG. 20 shows a flow chart of example link binding operations triggered by the link binding broker.

The binding broker may also trigger link binding operations, with the corresponding procedures shown in FIG. 20.

At step 0, a broker assisted link binding between a source resource and a destination resource has been established.

At step 1, the binding broker triggers a link binding operation (update, suspension, restoration, or cancellation).

At step 2, the binding broker sends a link binding operation request to the endpoint that is hosting the binding entry. The operation request may contain the linkBindingURI of the link binding entry and attributes that are involved in the operation (e.g., updated values of parameters).

At step 3, the binding broker informs the other endpoint of the operation (which is not hosting the binding entry) by sending a link binding notification request.

At step 4, the endpoint informed in step 3 sends a response to the binding broker indicating whether they agree to perform the operation.

At step 5, if the other endpoint agrees on the operation, then the binding broker sends a confirmation to the endpoint informed in step 2 indicating that the operation can be performed. Otherwise, the broker may ask the SRH or DRH to discard the operation request.

At step 6, the desired operation is performed on the corresponding entities. If the existing binding is in "Push" method, then the operation may be performed on both the SRH and the binding broker. If the existing binding is in "Polling/Observe" method, then the operation may be done on the DRH.

At step 7, the SRH (Step 7(*a*)) or DRH (Step 7(*b*)) sends a link binding operation response containing the status of the operation to the binding broker.

The proposed advanced link binding functions and procedures can be implemented in oneM2M functional architecture as a new common service function, which may be enabled by new resources and attributes as described below.

A linkBindingRole may be added to the common attributes for link binding, which may take values from sourceResourceRole, destinationResourceRole, eitherSourceOrDestinationRole, noRole, ect. To implement the newly proposed binding chain and broker assisted binding, two new values of this attribute are proposed as shown in Table 3.

TABLE 3

Updated Common Attribute for Link Binding

| Attribute Name | Description |
| --- | --- |
| linkBindingRole | Indicates the link binding role of the parent resource. The value of this attribute could be: sourceResourceRole, destinationResourceRole, either SourceOrDestinationRole, chainRole, brokerRole, or noRole. The chainRole indicates that the parent resource could be either a source resource or a destination resource, or both, which means it can be placed in a binding chain as an intermediate resource. The brokerRole indicates that the parent resource is at the binding broker. |

A linkBindingInstance resource has been proposed to represent a created/enforced link binding at a DRH (Polling/Observe mode) or SRH (Push mode). In order to enable dynamic binding method switching, a new child resource of the <linkBindingInstance> resource is added to trigger the switching as shown in Table 4.

TABLE 4

New child resource of <linkBindingInstance> resource

| Child Resources of <linkBindingInstance> | Child Resource Type | Multiplicity | Description | <linkBindingInstanceAnnc> Child Resource Types |
| --- | --- | --- | --- | --- |
| switch | <switch> | 1 | A virtual resource. An UPDATE operation on this virtual resource is used to switch the binding method of the parent <linkBindingInstance> resource. | none |

Correspondingly, a new attribute newBindingMethod is added to the <linkBindingInstance> resource to indicate the new binding method to switch to. In dynamic binding method switching, since the binding entry can be temporarily enabled/disabled, another new attribute is added to the <linkBindingInstance> resource to represent the status of the binding entry. The new attributes are shown in Table 5.

TABLE 5

New attribute of <linkBindingInstance> resource

| Attributes of <linkBindingInstance> | Multiplicity | RW/ RO/ WO | Description | <linkBindingInstanceAnnc> Attributes |
| --- | --- | --- | --- | --- |
| newBindingMethod | 0 . . . 1 | RW | Indicates the new binding method after switching. | OA |
| bindingEntryStatus | 0 . . . 1 | RW | Indicates the status of the <linkBindingInstance> resource. Different from linkBindingStatus, bindingEntryStatus stands for whether the information in this resource will be actively used in the binding. When the binding method is switched, the <linkBindingInstance> resource created at the destination resource (if switching from "Polling/Observe" to "Push") or source resource (switching | OA |

TABLE 5-continued

New attribute of <linkBindingInstance> resource

| Attributes of <linkBindingInstance> | Multiplicity | RW/ RO/ WO | Description | <linkBindingInstanceAnnc> Attributes |
|---|---|---|---|---|
| | | | from "Push" to "Polling/Observe") can be temporarily disabled by setting bindingEntryStatus to 0. The default value is 1. | |

A new resource bindingChainInstance is proposed to record a set of connected link bindings. A bindingChainInstance resource can be discovered by an AE/CSE to get the information of the binding chain or updated by an AE/CSE when a link binding is added/updated to the binding chain. The recorded binding chain is not necessarily a linear chain, but can take form of a tree structure if some intermediate resource establishes link bindings with multiple destination resources. The <bindingChainInstance> resource shall contain the attributes specified in Table 6.

Figure 21:
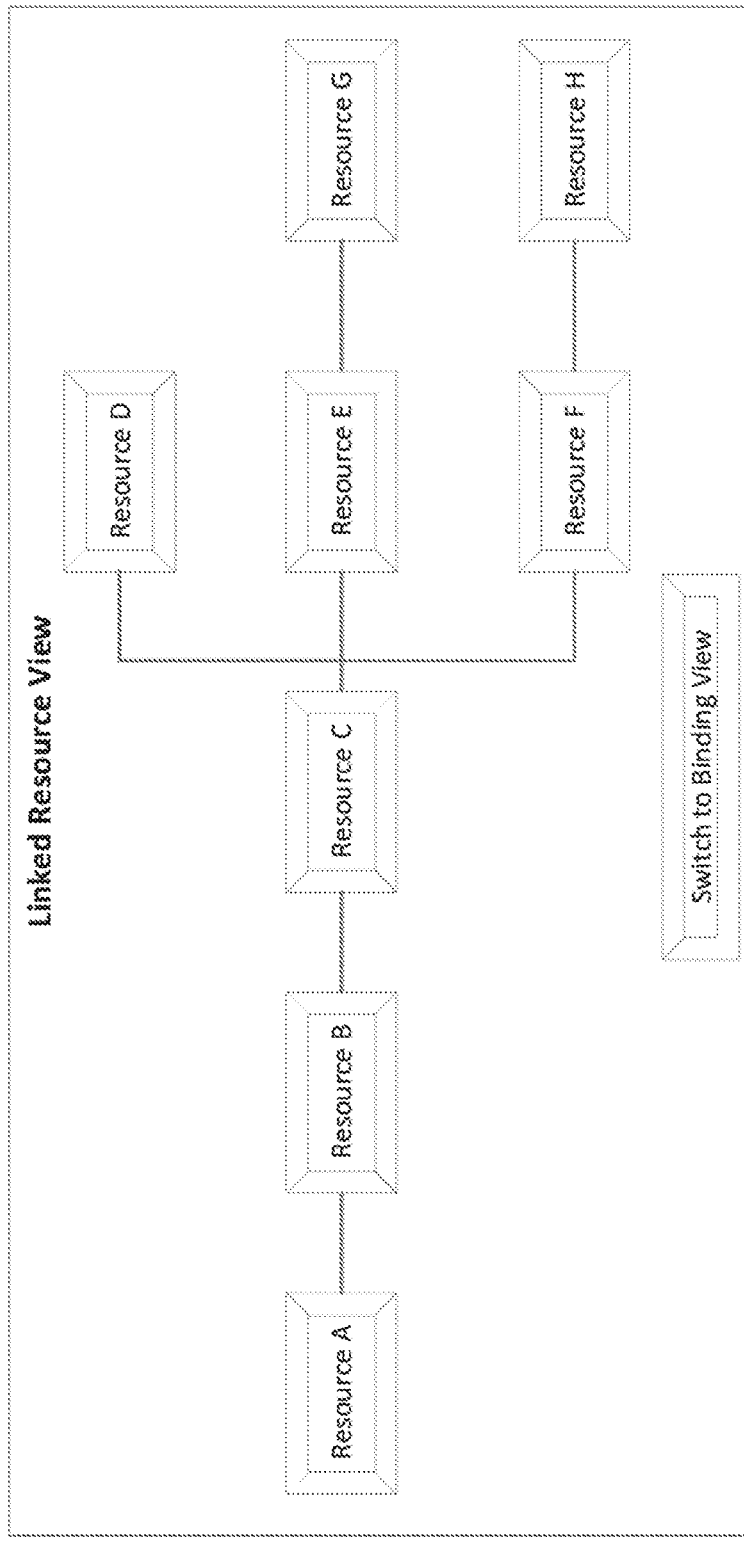
FIG. 21 shows a resource view of an example user interface.
Figure 23:
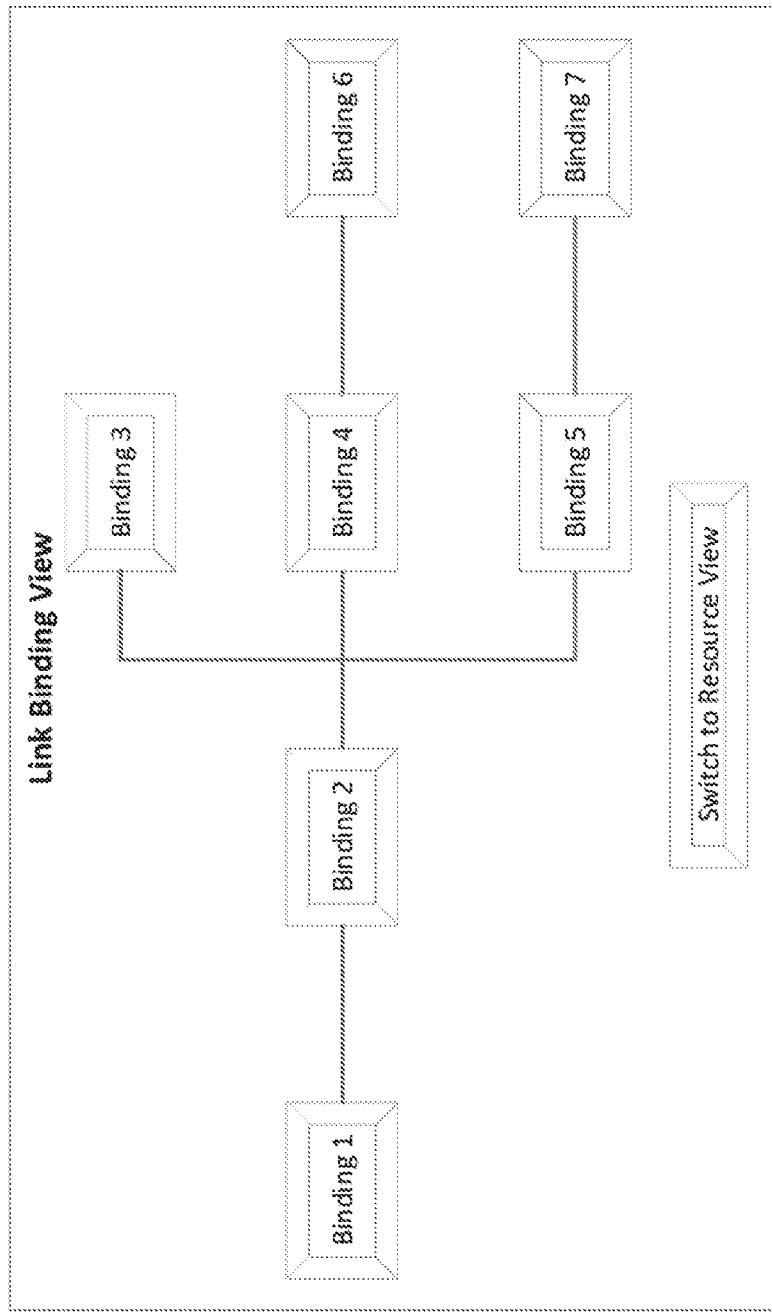
FIG. 23 shows a link binding view of an example user interface.
Figure 24:
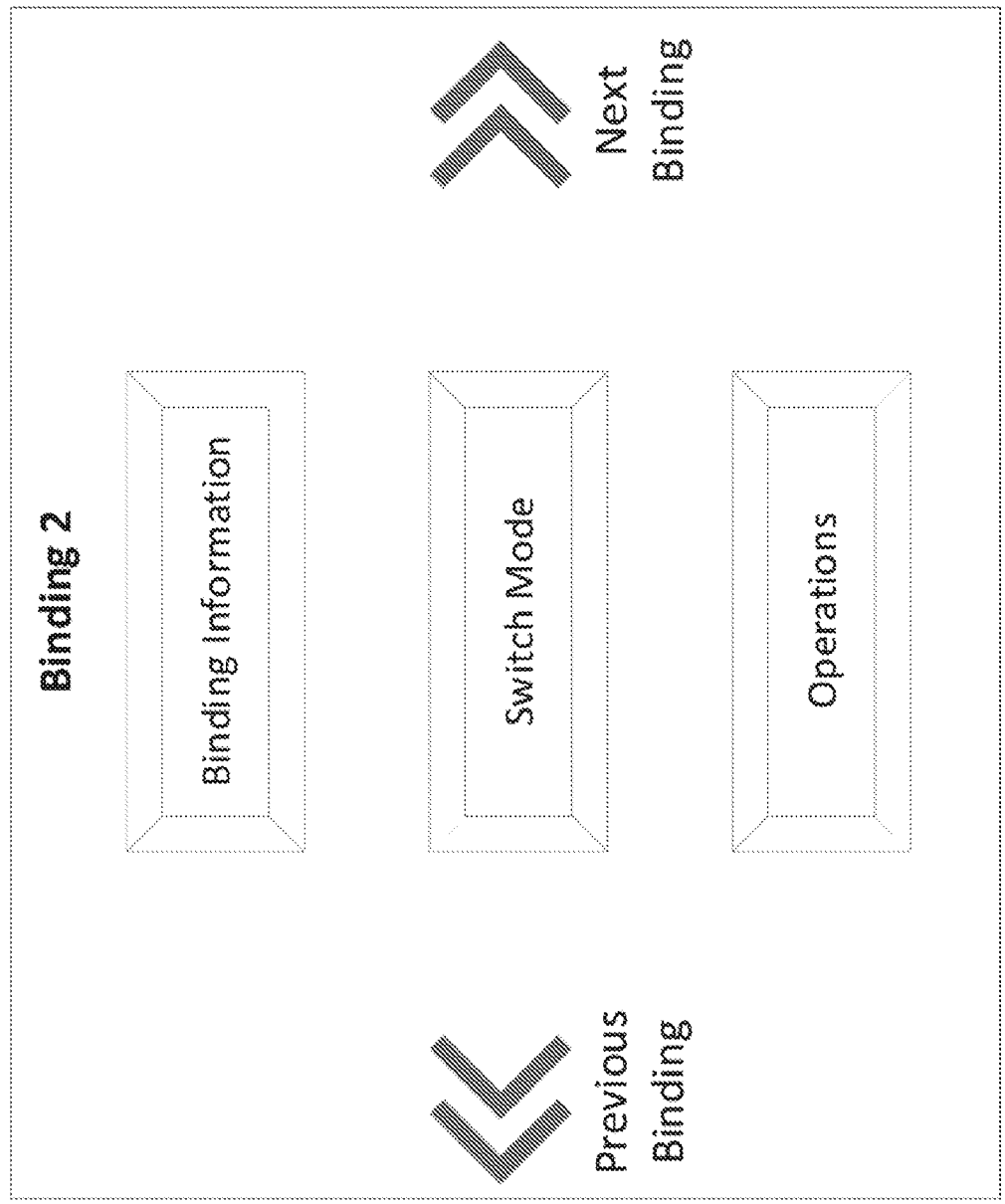
FIG. 24 shows a single link binding view of an example user interface.

By clicking on the "switch to binding view" button of FIG. 21, the connected link bindings (binding chain) may be shown, as in FIG. 23. Clicking on one of the binding button will lead to the detailed information of the link binding (FIG. 24). On the interface of FIG. 24, the user may view the binding information (such as binding method and binding attributes), switch binding method, or perform link binding operations (update, suspension, restoration, cancellation). The left or right arrow button can be used to view the previous or next hop of link binding(s).

TABLE 6

Attributes of <bindingChainInstance> resource

| Attributes of <bindingChainInstance> | Multiplicity | RW/ RO/ WO | Description | <bindingChainInstanceAnnc> Attributes |
|---|---|---|---|---|
| bindingChainSourceURI | 1 | RW | Indicates the URI of the source resource in the first hop link binding of <bindingChainInstance>. The source resource does not have to be the original source, but may be the start point of the binding chain recorded in this <bindingChainInstance>. | OA |
| bindingChainSize | 0 . . . 1 | RW | Indicates the number of link bindings recorded in this <bindingChainInstance>. | OA |
| bindingChainLength | 0 . . . 1 | RW | Indicates the length of the longest binding chain recorded in this <bindingChainInstance>. In other words, it is the distance from the source resource (indicated by bindingChainSourceURI) to the farthest destination resource in this binding chain. If the binding chain is linear without branch, then the values of bindingChainSize and bindingChainLength may be equal. | OA |
| linkBindingInfo | 0 . . . 1(L) | RW | This attribute contains a list of information of the link bindings recorded in this <bindingChainInstance>. Each item of this list corresponds to a recorded link binding and may contain: 1) the URI of the link binding, 2) the source resource URI of this link binding, 3) destination resource URI of this link binding, and/or 4) binding method. The connections between link bindings can be inferred based on this information by tracing the source resource URI of each link. For example, if a binding's source resource URI is the same as another binding's destination resource URI, then these two bindings may be connected in the binding chain. | OA |

Figure 22:
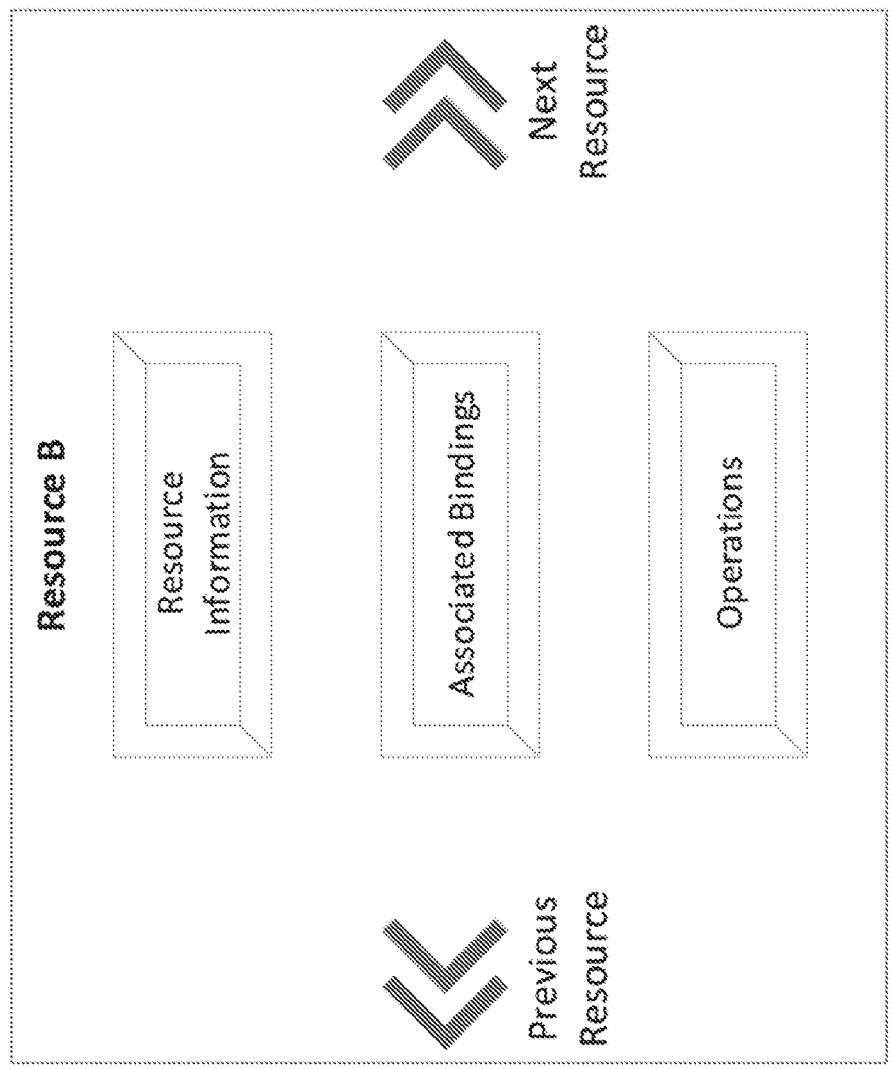
FIG. 22 shows a single resource view of an example user interface.

FIG. 21 shows a user interface for viewing the linked resources that are registered in the RR. By clicking on one of the resource buttons, the user may access detailed information of the resource, as shown in FIG. 22. The user may view the resource information (such as resource URI), a list of link bindings associated with this resource, and operations (such as modifications). The left or right arrow button can be used to view the logically previous or next resource (s), such as the source resource or destination resource(s) with respect to the current resource.

Figure 25A:
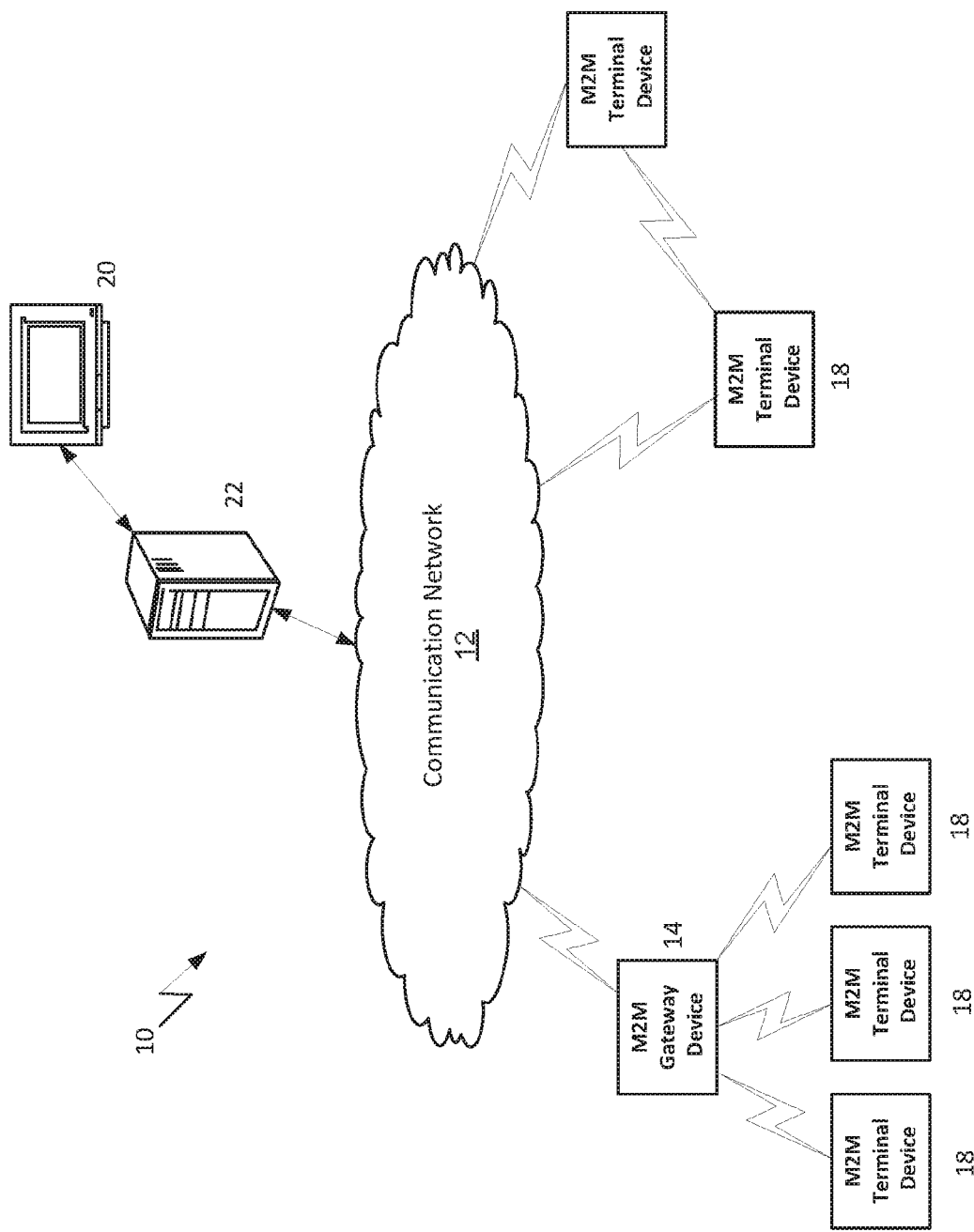
FIG. 25A shows an example system diagram of an example machine-to-machine (M2M) or Internet of Things (IoT) communication system in which one or more disclosed embodiments may be implemented.
Figure 25B:
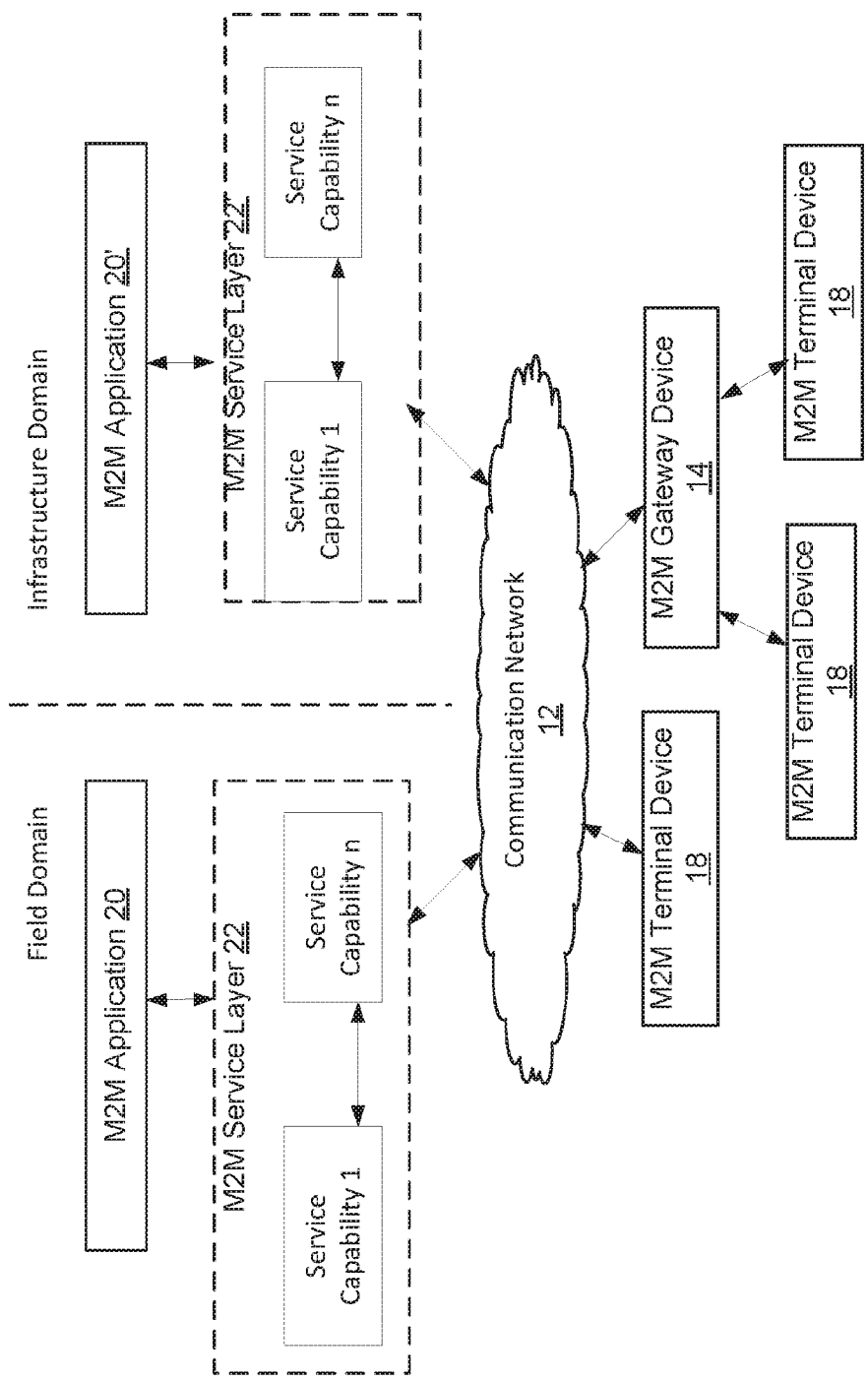
FIG. 25B shows an example system diagram of an example architecture that may be used within the M2M/IoT communications system illustrated in FIG. 25A.
Figure 25C:
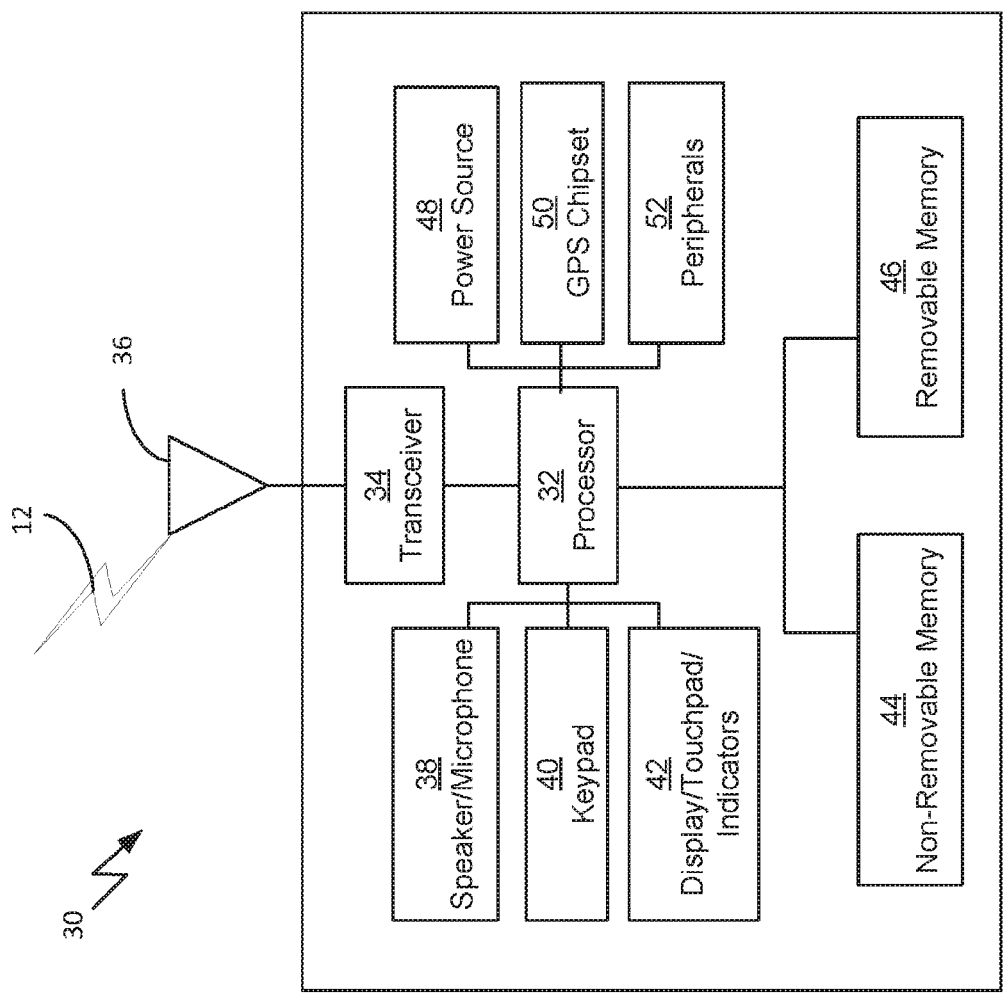
FIG. 25C shows an example system diagram of an example M2M/IoT terminal or gateway device that may be used within the communications system illustrated in FIG. 25A.
Figure 25D:
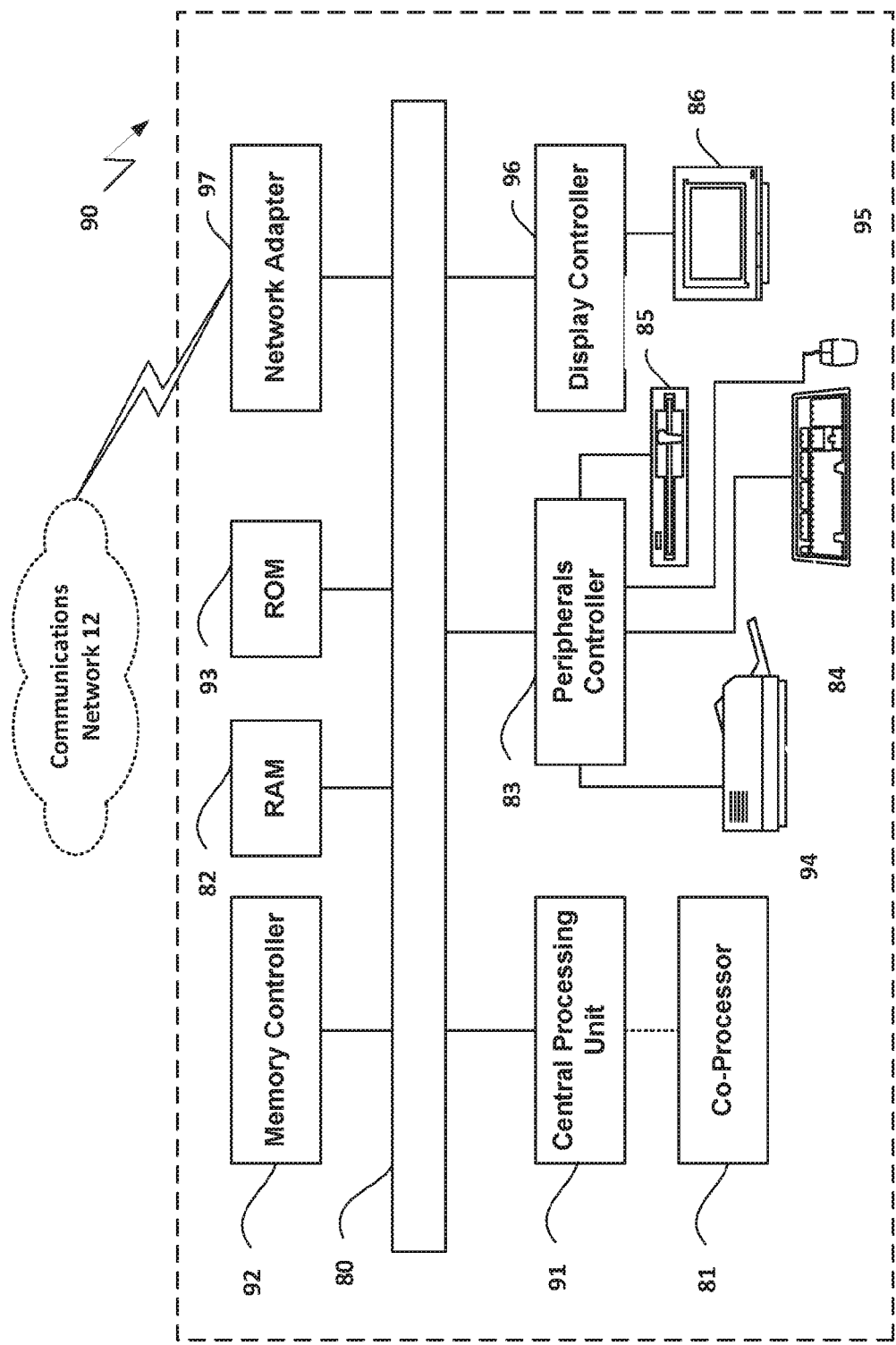
FIG. 25D shows an example block diagram of an example computing system in which aspects of the communication system of FIG. 25A may be embodied.

Any of the entities performing the steps illustrated in FIGS. 4-20 such as the service layer, service layer device, service layer application, application entity, SRH, DRH, LBC, and the like, may be logical entities that may be implemented in the form of software (i.e., computer-executable instructions) stored in a memory of, and executing on a processor of, an apparatus configured for wireless and/or network communications or a computer system such as those illustrated in FIG. 25C or FIG. 25D. That is, the method(s) illustrated in FIGS. 4-20 may be implemented in the form of software (i.e., computer-executable instructions) stored in a memory of an apparatus, such as the apparatus or computer system illustrated in FIG. 25C or FIG. 25D, which computer executable instructions, when executed by a processor of the apparatus, perform the steps illustrated in FIGS. 4-20. It is also understood that any transmitting and receiving steps illustrated in FIGS. 4-20 may be performed by communication circuitry of the apparatus/entity under control of the processor of the apparatus and the computer-executable instructions (e.g., software) that it executes.

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-24 may comprise a network apparatus of a communication system, such as the ones illustrated in FIGS. 25A-25D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 25B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices.

The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 25B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 25B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 25C or FIG. 25D described below.

Further, the methods and functionalities described herein may be implemented as part of an M2M network that uses a Service Oriented Architecture (SOA) and/or a Resource-Oriented Architecture (ROA) to access services.

FIG. 25C is a block diagram of an example hardware/software architecture of an apparatus of a network, such as one of the entities illustrated in FIGS. 1-24, which may operate as an M2M server, gateway, device, or other network apparatus in an M2M network such as that illustrated in FIGS. 25A and 25B. As shown in FIG. 25D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for advanced link binding management described herein, such as the methods operations illustrated and described in relation to FIGS. 1-24.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 1-24) and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/ receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 25D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 25C is a block diagram of an example computing system 90 which may also be used to implement one or more network apparatuses of a network, such as the entities illustrated in FIGS. 1-24 and described herein, which may operate as an M2M server, gateway, device, or other network apparatus in an M2M network such as that illustrated in FIGS. 25A and 25B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25D and its accompanying description.

Further, computing system 90 may contain communication circuitry, such as for example a network adaptor 97, that may be used to connect computing system 90 to an external communications network, such as network 12 of FIG. 25A-25D, to enable the computing system 90 to communicate with other apparatuses of the network. The communication circuitry, alone or in combination with the CPU 91, may be used to perform the transmitting and receiving steps described herein (e.g., in FIGS. 1-24) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

AE Application Entity
CSE Common Service Entity
CSF Common Service Function
DRH Destination Resource Host
IETF Internet Engineering Task Force
IoT Internet of Things
LBC Link Binding Coordinator
LBM Link Binding Management
M2M Machine-to-Machine
RC Resource Creator
REST Representational State Transfer
RR Resource Repository
SRH Source Resource Host
URI Uniform Resource Identifier The following is a list of terms and definitions relating to service layer technologies that may appear in the above description. Unless otherwise specified, the terms and definitions used herein refer to the corresponding term listed below:

| Term | Definition |
| --- | --- |
| Link Binding | A unidirectional logical link and abstract relationship between a source resource and a destination resource. The purpose of a binding is to synchronize the content between a source and a destination resource. |
| Source Resource | In a link binding, a source resource is the resource whose content will be copied or provided to a destination resource. |
| Source Resource Host (SRH) | A logical entity which hosts source resources. |
| Destination Resource | In a link binding, a destination resource is the resource whose content will be synchronized to and copied from the content of a source resource. |
| Destination Resource Host (DRH) | A logical entity which hosts destination resources. |
| Binding Method | A binding method defines the rules to generate the web-transfer exchanges that synchronize states between source and destination resources. Examples of binding methods include Poll, Push, and Observe. |
| Binding Entry | A binding entry defines and records the details of a link binding between a source resource and a destination resource. A binding entry includes several binding attributes which describe this particular binding. Since a binding is unidirectional, the binding entry is present only on the source resource host or destination resource host. |
| Binding Attribute | A binding attribute is a parameter used to describe a property of a binding entry. Examples of binding attributes include: (i) binding method (e.g. Poll, Push, or Observe), (ii) minimum period (for triggering a new state synchronization), (iii) maximum period (between two consecutive state synchronizations), (iv) change step (indicates how much the value of a resource should change before triggering a new state synchronization), (v) greater than (indicates the upper limit |

| Term | Definition |
| --- | --- |
| | that the resource value should cross before triggering a new state synchronization), (vii) less than (indicates the lower limit that the resource value should cross before triggering a new state synchronization), and (viii) notification band (allows a bounded or unbounded value range that may trigger multiple state synchronizations), etc.<br>Except the binding method, all other binding attributes describe certain conditions and are referred to as binding condition attributes. |
| State Synchronization or Content Synchronization | Depending on the binding method (Poll, Observe, Push) different REST methods may be used to synchronize the resource values between a source and a destination. The process of using a REST method to achieve this is defined as "State Synchronization" or "Content Synchronization". |
| Binding Table | The binding table is a special resource that contains and gives access to all binding entries on a source resource host (for Push) or a destination resource host (for Polling and Observe). |
| Link Binding Coordinator (LBC) | A logical entity or a management application which manages link bindings between source resources and destination resources (e.g. to discover source resources and destination resources, to formulate appropriate link bindings, to create a link binding and set attributes of a binding entry, to update a link binding by changing the attributes of a binding entry, and to cancel a link binding, etc.) |
| Binding Chain | A sequence of link bindings connected in a chain consisting of multiple hops, where each hop stands for a link binding with the source resource in a hop being the destination resource of the previous hop, and the destination resource in a hop being the source resource of the next hop. |
| Binding Broker | A logical entity that enables indirect communications between the source and destination resources. Specifically, the binding broker stores the content of a source resource, which can be accessed by a destination resource. The binding broker acts as a relay or a proxy between the source resource and destination resource, which is useful especially when there is limited direct reachability between the source resource and the destination resource. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method performed at an intermediate resource host, the method comprising:
   receiving, from a source resource host that is connected to a destination resource host by an existing link binding, a request for the intermediate resource host to create an intermediate resource between the source resource host and the destination resource host, wherein the request to create the intermediate resource comprises information associated with the existing link binding between the source resource host and the destination resource host;
   creating the intermediate resource;
   sending, to the source resource host, an indication that the intermediate resource has been created;
   receiving, from the source resource host, a request to create a plurality of link binding entries, wherein the plurality of link binding entries comprise a first link binding entry between the source resource host and the intermediate resource host and a second link binding entry between the intermediate resource host and the destination resource host; and
   creating the plurality of link binding entries.

2. The method of claim 1, wherein the intermediate resource host is configured to receive information from one of the source resource host or the destination resource host and to send the information to the other one of the source resource host or the destination resource host.

3. The method of claim 1, wherein the source resource host determines, prior to sending the request to create the intermediate resource, that the intermediate resource host comprises sufficient storage and communication capabilities.

4. The method of claim 1, wherein the indication that the intermediate resource has been created comprises an identifier of the intermediate resource.

5. The method of claim 1, wherein the plurality of link binding entries corresponds to the number of hops between the source resource host and the destination resource host.

6. The method of claim 1, further comprising sending, to the source resource host, an indication that the plurality of link binding entries have been created and an identifier associated with the plurality of link binding entries.

7. The method of claim 1, further comprising:
   determining to bind the source resource host and the destination resource host directly;
   sending, to the source resource host, an updated binding entry comprising an indication that the source resource host will bind directly to the destination resource host;
   receiving, from the source resource host, an indication that the binding entry has been updated at the source resource host;
   sending, to the destination resource host, a notification that the binding entry has been updated at the source resource host; and receiving, from the destination resource host, an indication that the link binding entry between the intermediate resource host and the destination resource host has been deleted or disabled.

8. An apparatus comprising a processor and a memory, the memory storing computer-executable instructions which, when executed by the processor, cause the apparatus to implement an intermediate resource host configured to perform operations comprising:

receiving, from a source resource host that is connected to a destination resource host by an existing link binding, a request for the intermediate resource host to create an intermediate resource between the source resource host and the destination resource host, wherein the request to create the intermediate resource comprises information associated with the existing link binding between the source resource host and the destination resource host;

creating the intermediate resource;

sending, to the source resource host, an indication that the intermediate resource has been created;

receiving, from the source resource host, a request to create a plurality of link binding entries, wherein the plurality of link binding entries comprise a first link binding entry between the source resource host and the intermediate resource host and a second link binding entry between the intermediate resource host and the destination resource host; and creating the plurality of link binding entries.

9. The apparatus of claim 8, wherein the intermediate resource host is configured to receive information from one of the source resource host or the destination resource host and to send the information to the other one of the source resource host or the destination resource host.

10. The apparatus of claim 8, wherein the source resource host determines, prior to sending the request to create the intermediate resource, that the apparatus comprises sufficient storage and communication capabilities required to act as the intermediate resource host.

11. The apparatus of claim 8, wherein the indication that the intermediate resource has been created comprises an identifier of the intermediate resource.

12. The apparatus of claim 8, wherein the plurality of link binding entries corresponds to the number of hops between the source resource host and the destination resource host.

13. The apparatus of claim 8, wherein the instructions, when executed, further cause the intermediate resource host to perform operations comprising sending, to the source resource host, an indication that the plurality of link binding entries have been created and an identifier associated with the plurality of link binding entries.

14. The apparatus of claim 8, wherein the instructions, when executed, further cause the intermediate resource host to perform operations comprising:

determining to bind the source resource host and the destination resource host directly;

sending, to the source resource host, an updated binding entry comprising an indication that the source resource host will bind directly to the destination resource host;

receiving, from the source resource host, an indication that the binding entry has been updated at the source resource host;

sending, to the destination resource host, a notification that the binding entry has been updated at the source resource host; and receiving, from the destination resource host, an indication that the link binding entry between the intermediate resource host and the destination resource host has been deleted or disabled.

15. A computer-readable storage medium storing instructions which, when executed by a processor, implement an intermediate resource host configured to perform operations comprising:

receiving, from a source resource host that is connected to a destination resource host by an existing link binding, a request for the intermediate resource host to create an intermediate resource between the source resource host and the destination resource host, wherein the request to create the intermediate resource comprises information associated with the existing link binding between the source resource host and the destination resource host;

creating the intermediate resource;

sending, to the source resource host, an indication that the intermediate resource has been created;

receiving, from the source resource host, a request to create a plurality of link binding entries, wherein the plurality of link binding entries comprise a first link binding entry between the source resource host and the intermediate resource host and a second link binding entry between the intermediate resource host and the destination resource host; and creating the plurality of link binding entries.

16. The computer-readable storage medium of claim 15, wherein the intermediate resource host is configured to receive information from one of the source resource host or the destination resource host and to send the information to the other one of the source resource host or the destination resource host.

17. The computer-readable storage medium of claim 15, wherein the source resource host determines, prior to sending the request to create the intermediate resource, that the intermediate resource host comprises sufficient storage and communication capabilities.

18. The computer-readable storage medium of claim 15, wherein the indication that the intermediate resource has been created comprises an identifier of the intermediate resource.

19. The computer-readable storage medium of claim 15, wherein the plurality of link binding entries corresponds to the number of hops between the source resource host and the destination resource host.

20. The computer-readable storage medium of claim 15, wherein the instructions, when executed, further cause the intermediate resource host to perform operations comprising sending, to the source resource host, an indication that the plurality of link binding entries have been created and an identifier associated with the plurality of link binding entries.

* * * * *